(12) United States Patent
Bazbaz

(10) Patent No.: US 9,669,981 B2
(45) Date of Patent: Jun. 6, 2017

(54) EASY OPEN PLASTIC BAGS

(71) Applicant: Polytex Fibers Corporation, Houston, TX (US)

(72) Inventor: Jacobo Bazbaz, Bellaire, TX (US)

(73) Assignee: Polytex Fibers Corporation, Houston, TX (US)

( * ) Notice: Subject to any disclaimer, the term of this patent is extended or adjusted under 35 U.S.C. 154(b) by 0 days.

(21) Appl. No.: 14/610,904

(22) Filed: Jan. 30, 2015

(65) Prior Publication Data
US 2015/0266644 A1   Sep. 24, 2015

Related U.S. Application Data

(63) Continuation-in-part of application No. 13/682,289, filed on Nov. 20, 2012, which is a continuation-in-part of application No. 13/372,211, filed on Feb. 13, 2012.

(51) Int. Cl.
| | | |
|---|---|---|
| *B65D 33/00* | (2006.01) | |
| *B65D 75/58* | (2006.01) | |
| *B32B 5/02* | (2006.01) | |
| *B32B 27/12* | (2006.01) | |
| *B65D 30/08* | (2006.01) | |
| *B32B 27/00* | (2006.01) | |

(52) U.S. Cl.
CPC .......... *B65D 75/5838* (2013.01); *B32B 5/024* (2013.01); *B32B 27/00* (2013.01); *B32B 27/12* (2013.01); *B65D 29/02* (2013.01); *B65D 31/04* (2013.01); *B65D 75/5844* (2013.01)

(58) Field of Classification Search
CPC .............. B65D 75/5838; B65D 75/585; B65D 75/5855
See application file for complete search history.

(56) References Cited

U.S. PATENT DOCUMENTS

| | | |
|---|---|---|
| 258,925 A | 6/1882 | Holmes |
| 2,634,896 A | 4/1953 | Graveno |
| 2,991,000 A | 7/1961 | Spees |
| (Continued) | | |

FOREIGN PATENT DOCUMENTS

| | | |
|---|---|---|
| CA | 2269652 | 4/2000 |
| EP | 1035028 | 9/2000 |
| (Continued) | | |

OTHER PUBLICATIONS

International Search Report and Written Opinion of the International Searching Authority, International Patent Application No. PCT/US2012/032520, Jul. 16, 2012.

(Continued)

*Primary Examiner* — Derek Battisti
(74) *Attorney, Agent, or Firm* — Vinson & Elkins LLP

(57) ABSTRACT

A woven laminated plastic bag having an easy open feature is provided. The easy open feature is generally defined by a weakened portion in the bag. In various aspects the bag can be fabricated from a woven polypropylene and/or polyethylene layer which can be laminated with a film layer, can form a pinch bottom bag, and can have one or both sides include graphics and/or printing. The bag can also provide a top end and/or a bottom end either or both of which provide a discrete area which may contain discrete graphics and/or printing.

37 Claims, 19 Drawing Sheets

(56) References Cited

U.S. PATENT DOCUMENTS

| | | |
|---|---|---|
| 3,058,647 A | 10/1962 | Reiselt |
| 3,203,620 A | 8/1965 | Becker |
| 3,285,498 A | 11/1966 | Becker |
| 3,508,701 A | 4/1970 | Saito et al. |
| 3,565,328 A | 2/1971 | Hudson |
| 3,648,922 A | 3/1972 | Gebo |
| 3,650,460 A | 3/1972 | Lokey |
| 3,685,720 A | 8/1972 | Brady |
| 3,687,356 A | 8/1972 | Goodrich |
| 3,990,626 A | 11/1976 | Goodrich |
| 4,008,850 A | 2/1977 | Goodrich |
| 4,142,667 A | 3/1979 | Runo |
| 4,292,332 A * | 9/1981 | McHam ............ B65D 81/3469 383/103 |
| 4,373,979 A | 2/1983 | Planeta |
| 4,441,613 A | 4/1984 | Ham |
| 4,460,091 A | 7/1984 | Ham |
| 4,480,752 A | 11/1984 | Jacobs |
| 4,512,479 A | 4/1985 | Ham |
| 4,515,273 A | 5/1985 | Jacobson |
| 4,557,385 A | 12/1985 | Robinson |
| 4,567,987 A | 2/1986 | Lepisto |
| 4,610,651 A | 9/1986 | Jacobson |
| 4,768,654 A | 9/1988 | Jacobs |
| 4,785,940 A | 11/1988 | Wilson |
| 4,811,849 A | 3/1989 | Rausing |
| 4,836,378 A | 6/1989 | Lephardt |
| 4,955,981 A | 9/1990 | Provost |
| 5,048,692 A | 9/1991 | Handler et al. |
| 5,188,235 A | 2/1993 | Pierce et al. |
| 5,217,307 A | 6/1993 | McClintock |
| 5,551,781 A | 9/1996 | Wilkes |
| 5,558,438 A | 9/1996 | Warr |
| 5,655,843 A | 8/1997 | Conrad |
| 5,830,543 A | 11/1998 | Miyake et al. |
| 5,836,697 A | 11/1998 | Chiesa |
| 5,855,435 A | 1/1999 | Chiesa |
| 5,902,047 A * | 5/1999 | Yeager .................... B31B 19/90 24/585.12 |
| 5,908,246 A | 6/1999 | Anmura |
| 5,938,013 A | 8/1999 | Palumbo |
| 5,979,655 A | 11/1999 | Tseng et al. |
| 6,013,018 A | 1/2000 | Bannister |
| 6,047,883 A | 4/2000 | Calvert et al. |
| 6,074,095 A | 6/2000 | Bannister |
| 6,126,316 A | 10/2000 | Bannister |
| 6,126,317 A * | 10/2000 | Anderson .......... B65D 75/5827 229/87.05 |
| 6,224,262 B1 | 5/2001 | Hogan et al. |
| 6,241,390 B1 | 6/2001 | Schneck |
| 6,315,448 B1 | 11/2001 | Thrall |
| 6,328,472 B1 | 12/2001 | Laurence |
| 6,334,711 B1 | 1/2002 | Risgalla |
| 6,367,976 B1 | 4/2002 | Bannister |
| 6,478,465 B1 | 11/2002 | Thrall |
| 6,609,999 B2 | 8/2003 | Albright |
| 6,635,711 B1 | 10/2003 | Miskovic et al. |
| 6,698,928 B2 * | 3/2004 | Miller ................ B65D 75/5838 229/87.05 |
| 6,800,051 B2 | 10/2004 | Koehn |
| 6,966,134 B2 * | 11/2005 | Ngan ...................... G09D 3/02 40/122 |
| 6,979,482 B2 | 12/2005 | Hartzell |
| 7,090,904 B2 | 8/2006 | Hartzell |
| 7,165,887 B2 | 1/2007 | Strand et al. |
| 7,237,953 B2 | 7/2007 | Healy |
| 7,311,442 B1 | 12/2007 | Moravek |
| 7,523,825 B2 | 4/2009 | Velazquez |
| 7,563,027 B2 | 7/2009 | Allen |
| 7,722,255 B2 | 5/2010 | Chiesa |
| 7,731,425 B2 | 6/2010 | Lin et al. |
| 7,753,588 B2 | 7/2010 | Bazbaz |
| 8,173,233 B2 * | 5/2012 | Rogers ..................... B32B 5/18 383/205 |
| 8,227,062 B2 | 7/2012 | Nowak |
| 8,240,915 B2 | 8/2012 | Sargin |
| 8,241,193 B2 | 8/2012 | Jansen |
| 8,241,194 B2 | 8/2012 | Skopek et al. |
| 8,297,840 B2 | 10/2012 | Jansen |
| 8,443,578 B2 | 5/2013 | Sargin |
| 8,475,046 B2 | 7/2013 | Jansen |
| 8,535,209 B2 | 9/2013 | Sargin |
| 8,540,427 B2 | 9/2013 | Steele |
| 9,073,281 B2 | 7/2015 | Sargin |
| 9,233,502 B2 | 1/2016 | Sargin |
| 2003/0040411 A1 | 2/2003 | Albright |
| 2003/0139516 A1 | 7/2003 | Quinn et al. |
| 2003/0152299 A1 | 8/2003 | Culbertson et al. |
| 2003/0228077 A1 | 12/2003 | Laske |
| 2004/0091648 A1 | 5/2004 | Hartzell et al. |
| 2005/0087542 A1 | 4/2005 | Bazbaz |
| 2005/0226542 A1 | 10/2005 | Kendall et al. |
| 2006/0045392 A1 | 3/2006 | Bannister |
| 2006/0072856 A1 | 4/2006 | Su |
| 2006/0285777 A1 * | 12/2006 | Howell .............. B65D 33/2591 383/63 |
| 2006/0285781 A1 * | 12/2006 | Zoss ...................... B65D 75/58 383/120 |
| 2007/0047852 A1 | 3/2007 | Sharp et al. |
| 2007/0047853 A1 | 3/2007 | Sharp et al. |
| 2007/0104905 A1 * | 5/2007 | Floyd, Jr. ............. B60R 21/235 428/36.1 |
| 2007/0140600 A1 * | 6/2007 | Nowak .................. B32B 5/024 383/116 |
| 2007/0292053 A1 | 12/2007 | Lin |
| 2008/0047228 A1 | 2/2008 | Anzini |
| 2008/0187695 A1 | 8/2008 | Nowak et al. |
| 2008/0292223 A1 | 11/2008 | Bannister |
| 2009/0080813 A1 * | 3/2009 | Rasmussen .......... B65D 75/008 383/205 |
| 2009/0136161 A1 * | 5/2009 | Hickey .............. B65D 33/1691 383/66 |
| 2009/0148081 A1 * | 6/2009 | Rogers .................... B31B 1/90 383/204 |
| 2009/0159192 A1 | 6/2009 | Bannister |
| 2009/0263048 A1 | 10/2009 | Iannelli et al. |
| 2009/0324143 A1 | 12/2009 | Sharp et al. |
| 2010/0029455 A1 | 2/2010 | Skopek |
| 2010/0154362 A1 | 6/2010 | Jansen |
| 2010/0158417 A1 | 6/2010 | Sharp et al. |
| 2010/0158418 A1 | 6/2010 | Jansen |
| 2010/0189380 A1 | 7/2010 | Sargin |
| 2010/0093501 A1 | 8/2010 | Koeningkramer |
| 2010/0209026 A1 * | 8/2010 | Koenigkramer ....... B65D 33/18 383/207 |
| 2010/0266223 A1 | 10/2010 | Lin |
| 2010/0270309 A1 | 10/2010 | Files |
| 2010/0278454 A1 | 11/2010 | Huffer |
| 2010/0293897 A1 | 11/2010 | Jansen |
| 2011/0002560 A1 | 1/2011 | Robles |
| 2011/0019944 A1 | 1/2011 | Sargin |
| 2011/0038569 A1 * | 2/2011 | Huffer ................ B65D 75/5844 383/207 |
| 2011/0082019 A1 | 4/2011 | Bannister |
| 2011/0103721 A1 | 5/2011 | Sargin |
| 2011/0147383 A1 * | 6/2011 | Soudais ................. B31B 19/90 220/270 |
| 2011/0255807 A1 | 10/2011 | Shapiro |
| 2011/0263400 A1 | 10/2011 | Sargin |
| 2012/0314979 A1 | 12/2012 | Heininga |
| 2012/0321229 A1 * | 12/2012 | Surdziel ................ B65D 31/02 383/207 |
| 2013/0016926 A1 | 1/2013 | Koehn |
| 2013/0047555 A1 | 2/2013 | Jansen |
| 2013/0206631 A1 | 8/2013 | Bazbaz |
| 2013/0209002 A1 | 8/2013 | Bazbaz |
| 2013/0330028 A1 | 12/2013 | Bannister |

(56) References Cited

U.S. PATENT DOCUMENTS

2014/0090339 A1    4/2014   Sargin
2015/0183194 A1    7/2015   Lehmann

FOREIGN PATENT DOCUMENTS

| | | |
|---|---|---|
| EP | 1035028 A1 | 9/2000 |
| EP | 1035028 B1 | 12/2002 |
| EP | 2263949 | 12/2010 |
| EP | 2599617 | 6/2013 |
| WO | 9961344 | 12/1999 |
| WO | WO 99/61344 A1 | 12/1999 |
| WO | 03040411 | 5/2003 |
| WO | WO 2005/030600 A1 | 4/2005 |
| WO | 2008146142 | 12/2008 |
| WO | 2008157681 | 12/2008 |
| WO | 2009082712 | 7/2009 |
| WO | WO 2010/093501 A1 | 8/2010 |
| WO | 2012040097 | 3/2012 |
| WO | 2012141981 | 10/2012 |
| WO | WO 2012/141981 A1 | 10/2012 |
| WO | 2013123015 | 8/2013 |
| WO | 2015103103 | 7/2015 |

OTHER PUBLICATIONS

International Search Report and Written Opinion of the International Searching Authority, International Patent Application No. PCT/US2013/025891, Apr. 29, 2013.
Co-Pending U.S. Appl. No. 13/441,358, filed Nov. 20, 2012.
Co-Pending U.S. Appl. No. 13/682,289, filed Apr. 6, 2012.
Co-Pending U.S. Appl. No. 61/713,323, filed Oct. 12, 2012.
Co-Pending U.S. Appl. No. 61/728,334, filed Nov. 20, 2012.
Co-Pending U.S. Appl. No. 61/755,322, filed Jan. 22, 2013.
Co-Pending U.S. Appl. No. 61/755,326, filed Jan. 22, 2013.

* cited by examiner

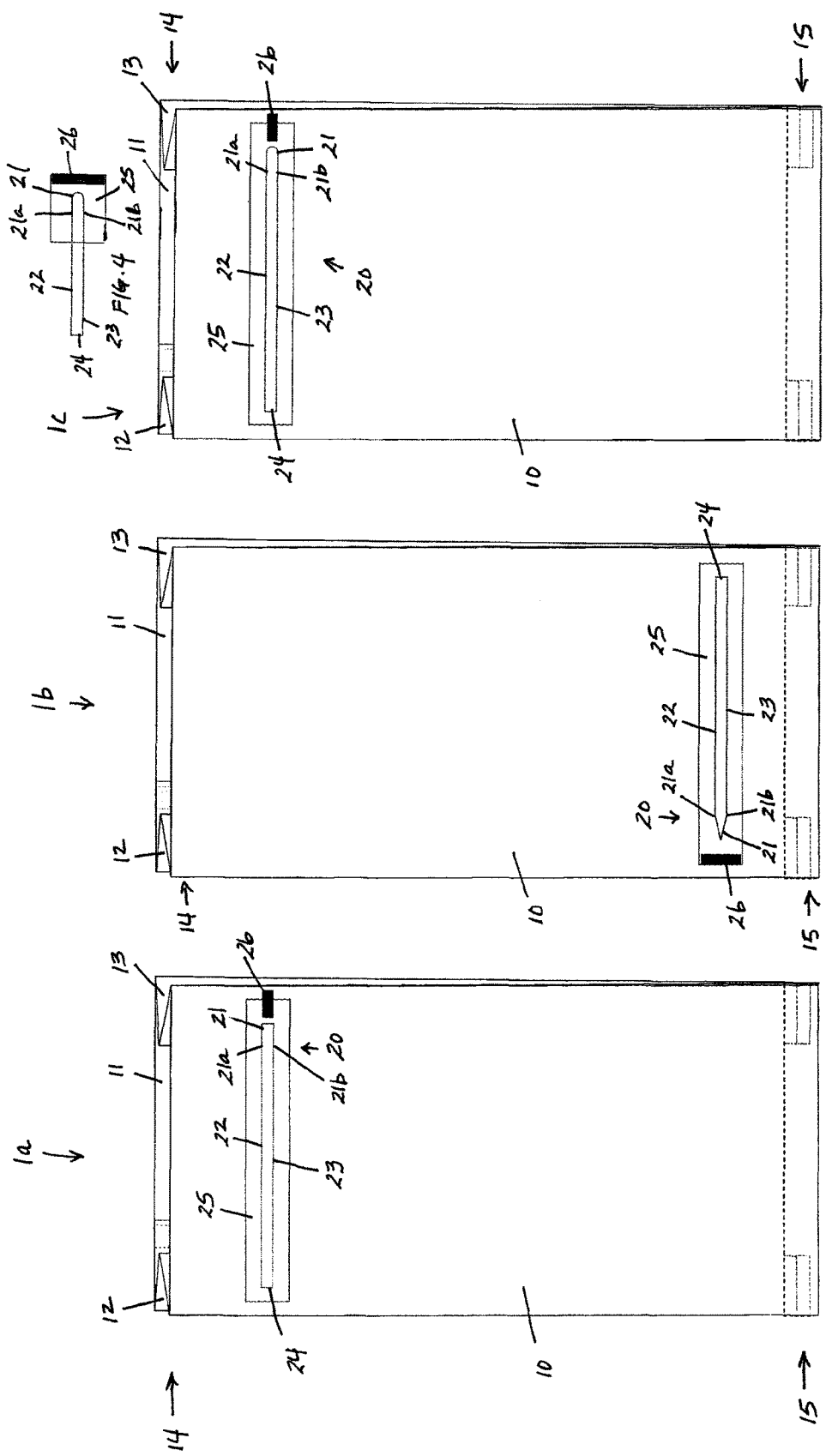

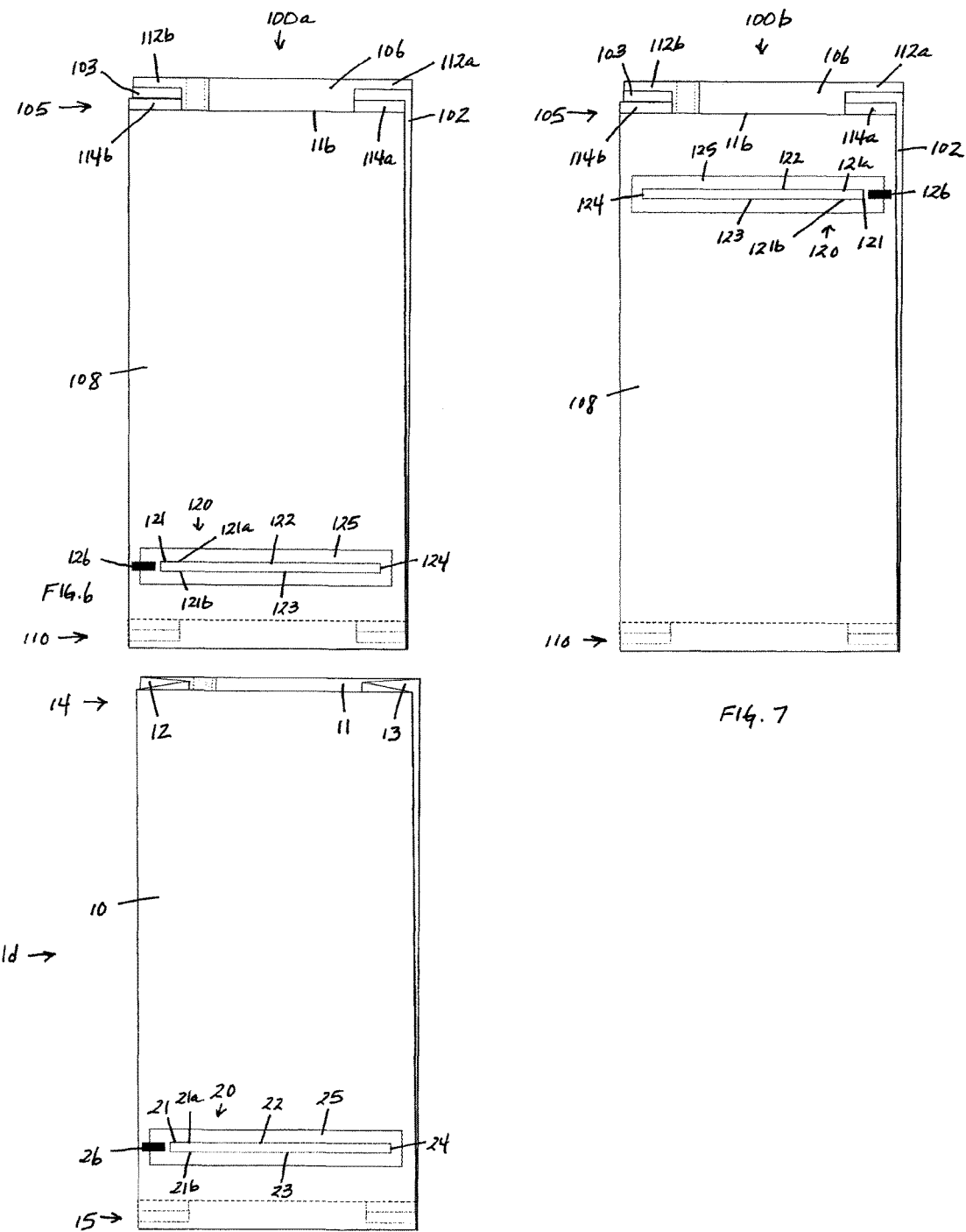

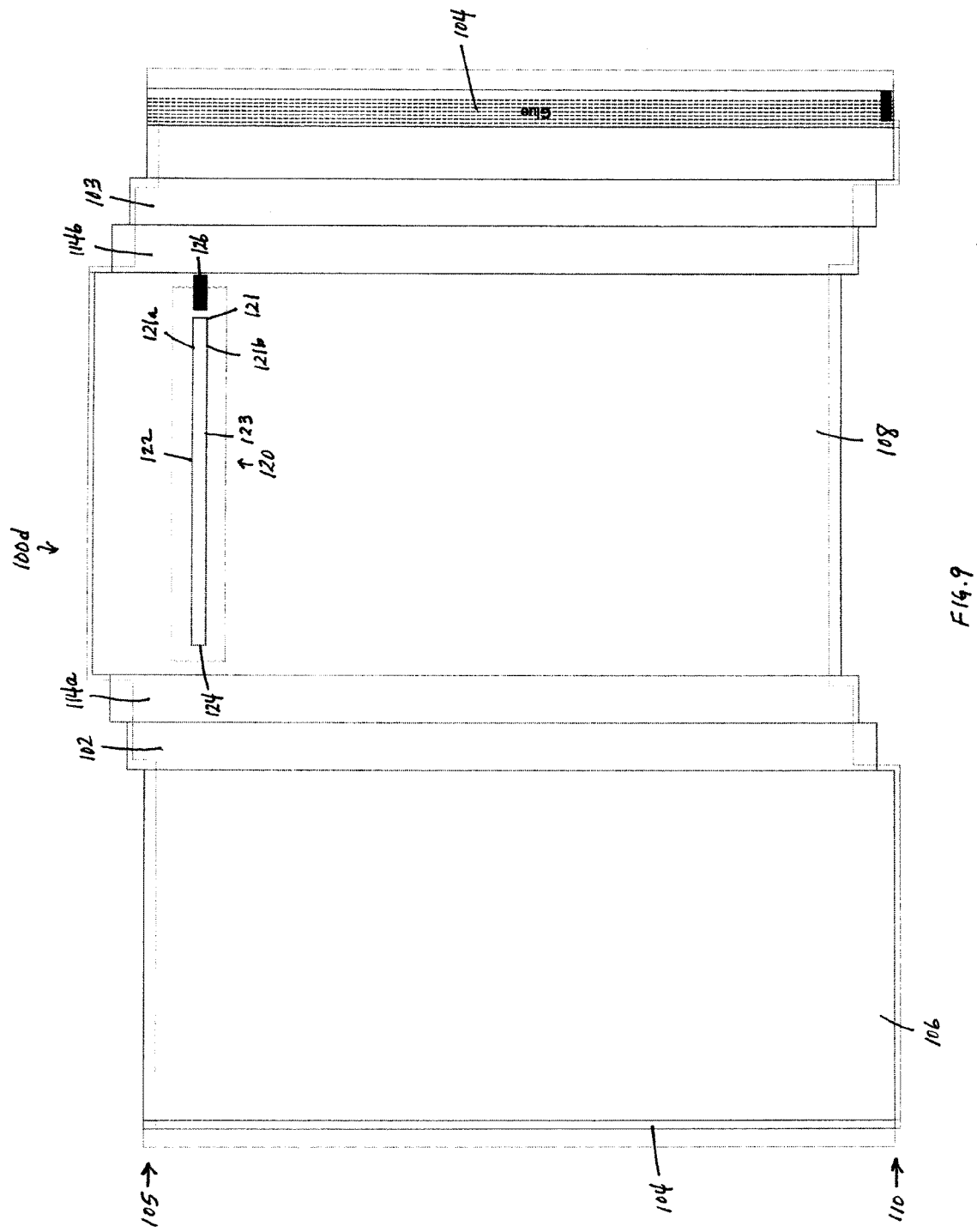

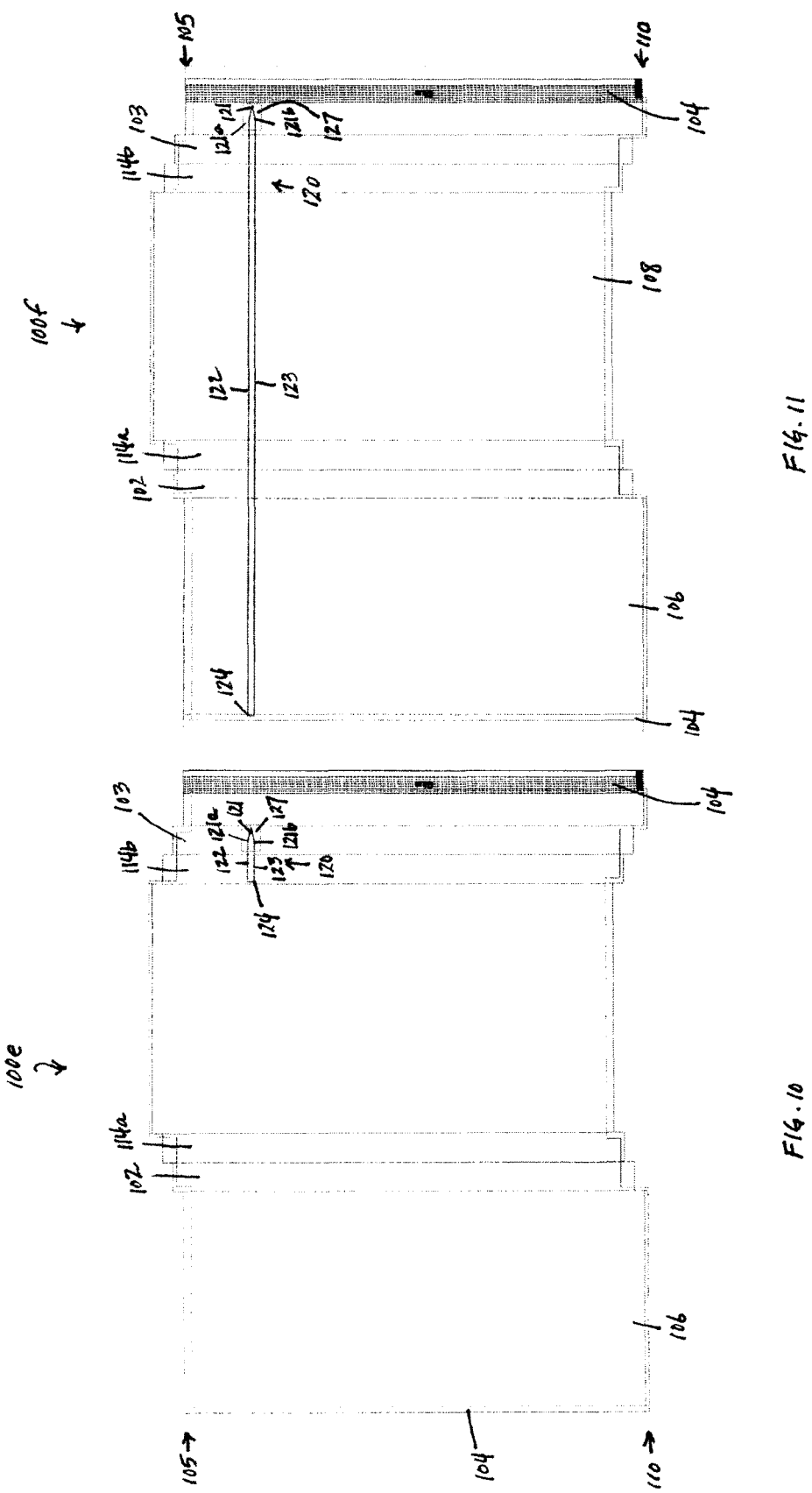

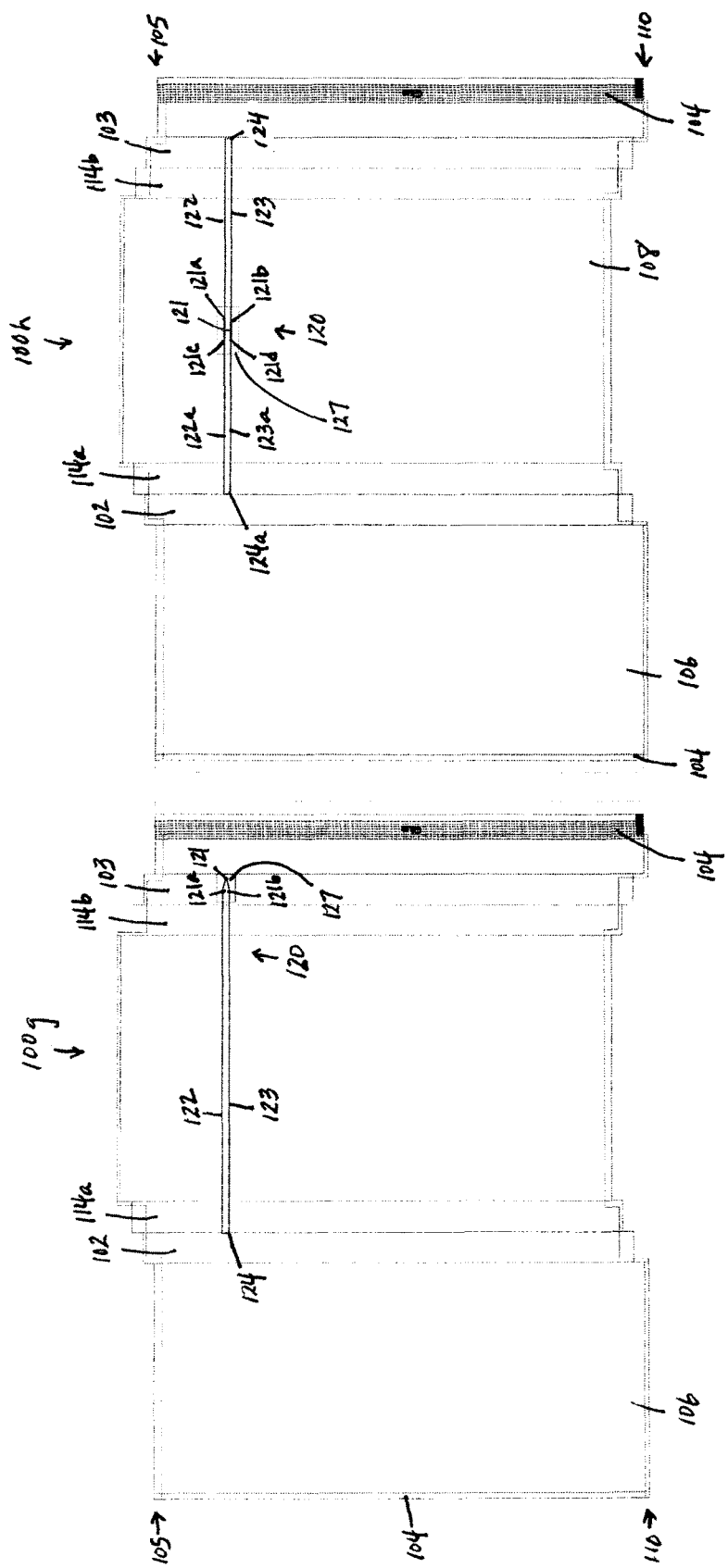

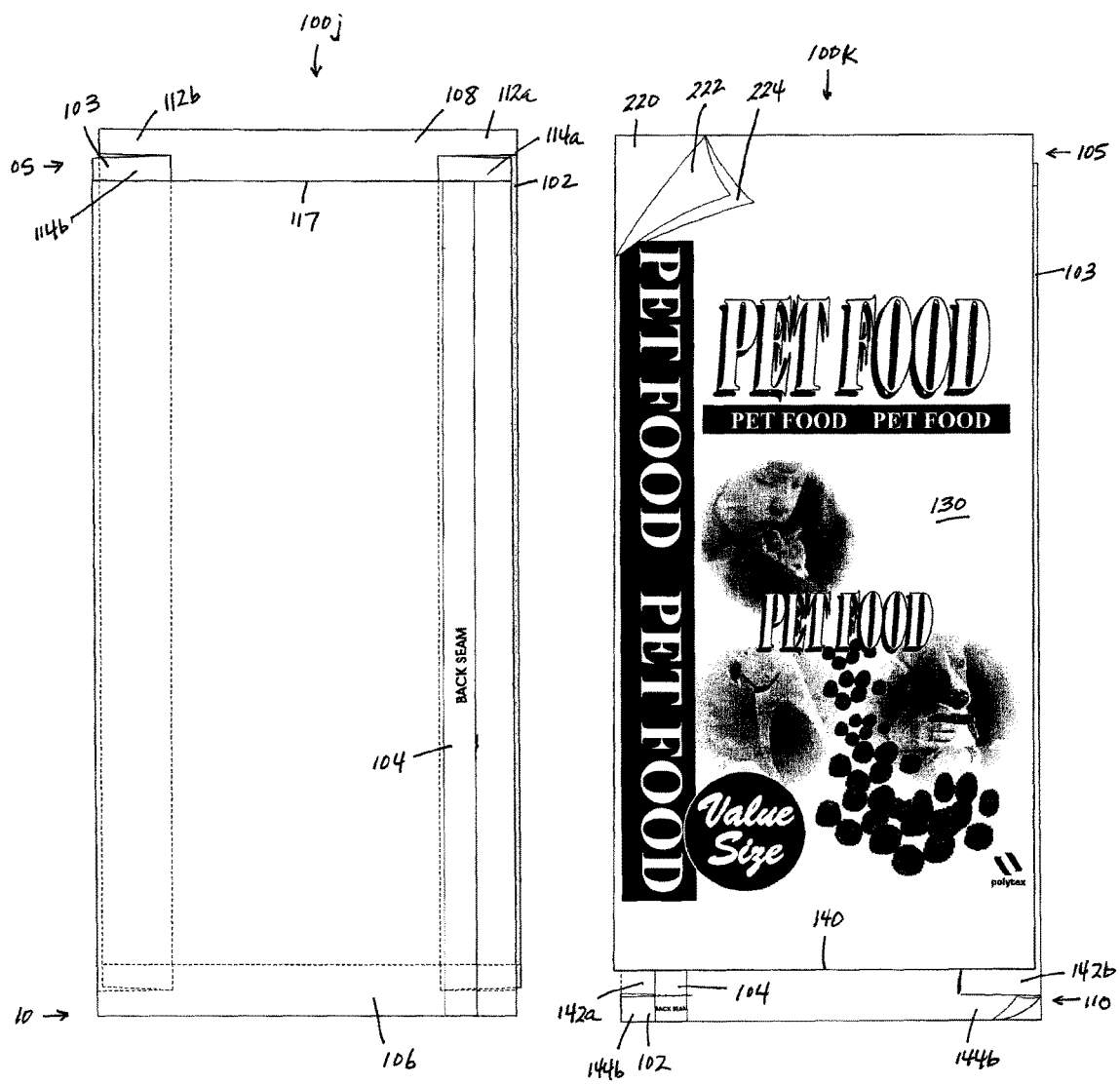

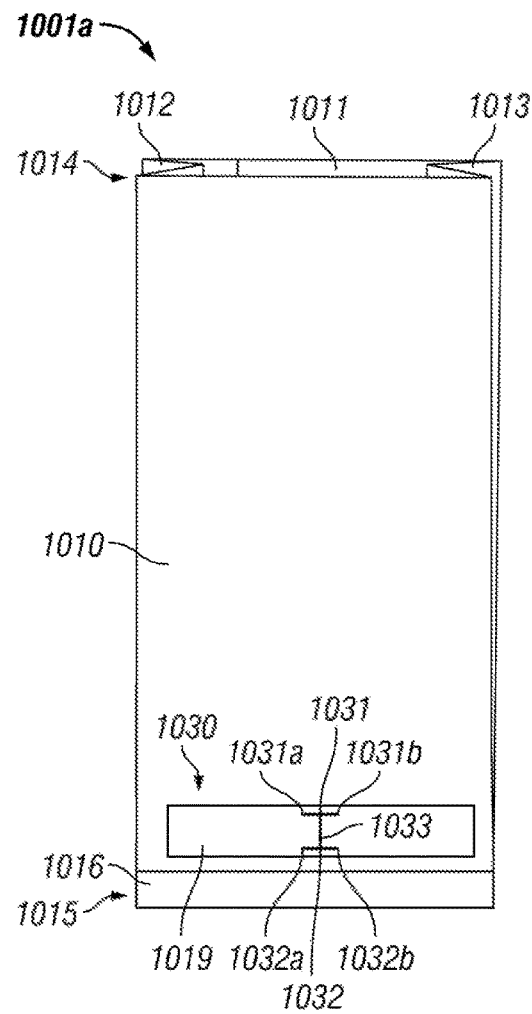
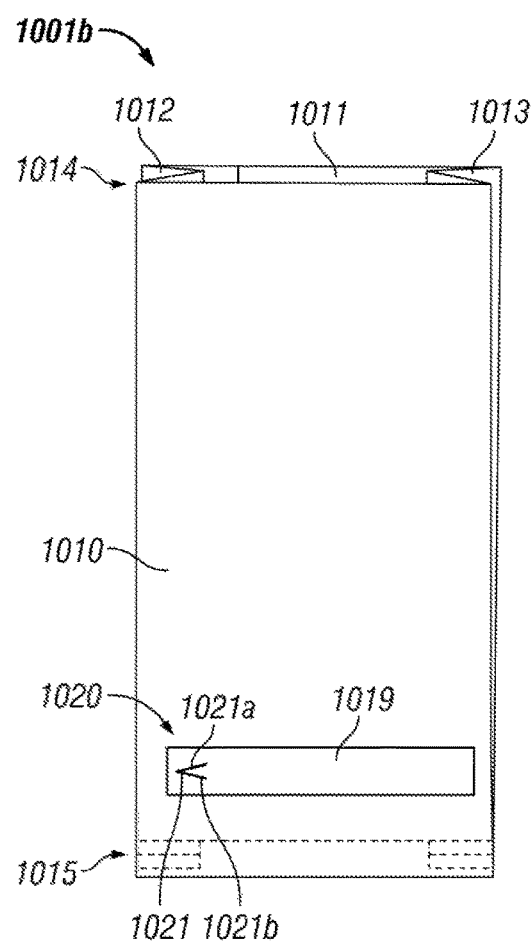
FIG. 18
FIG. 19

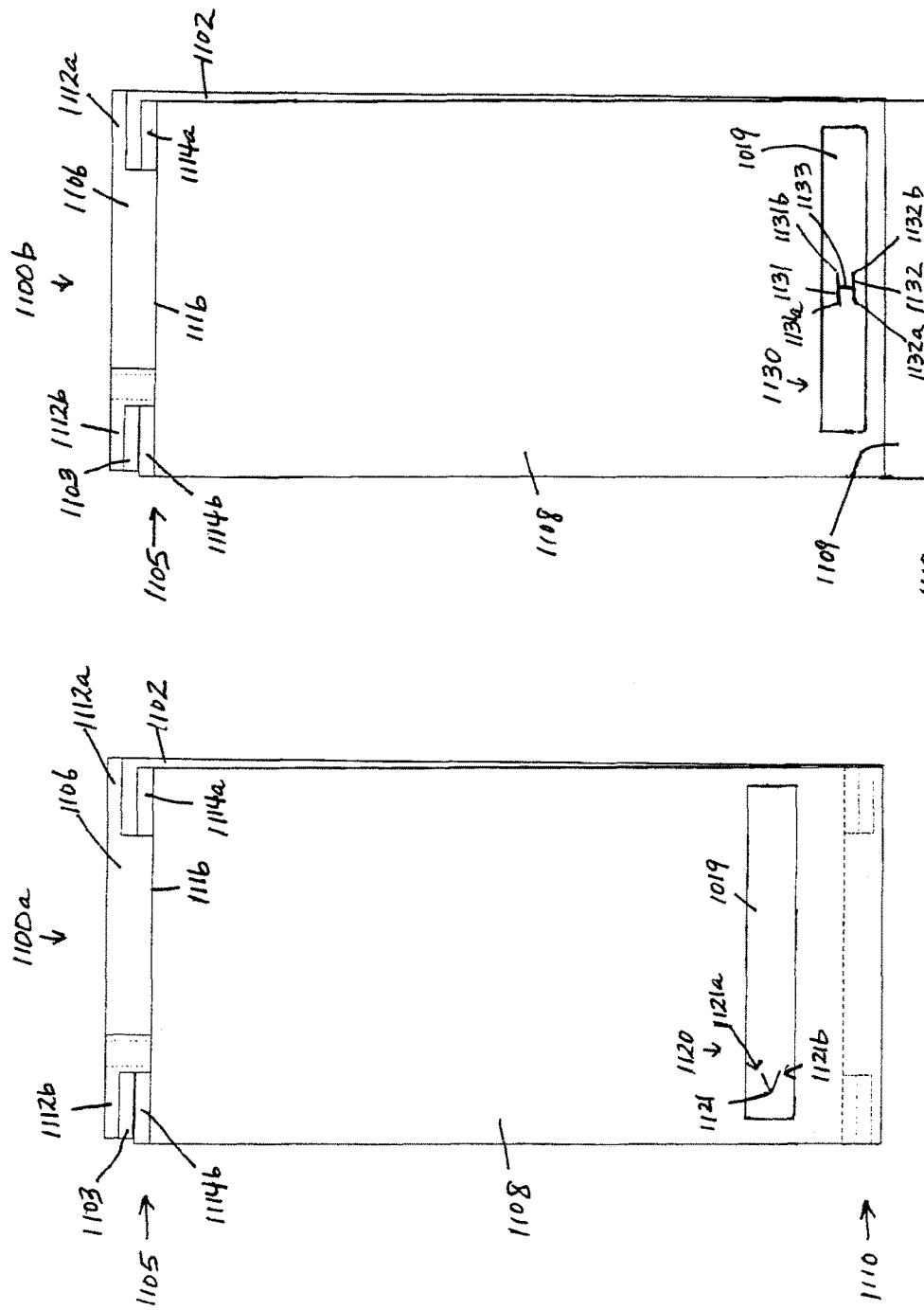

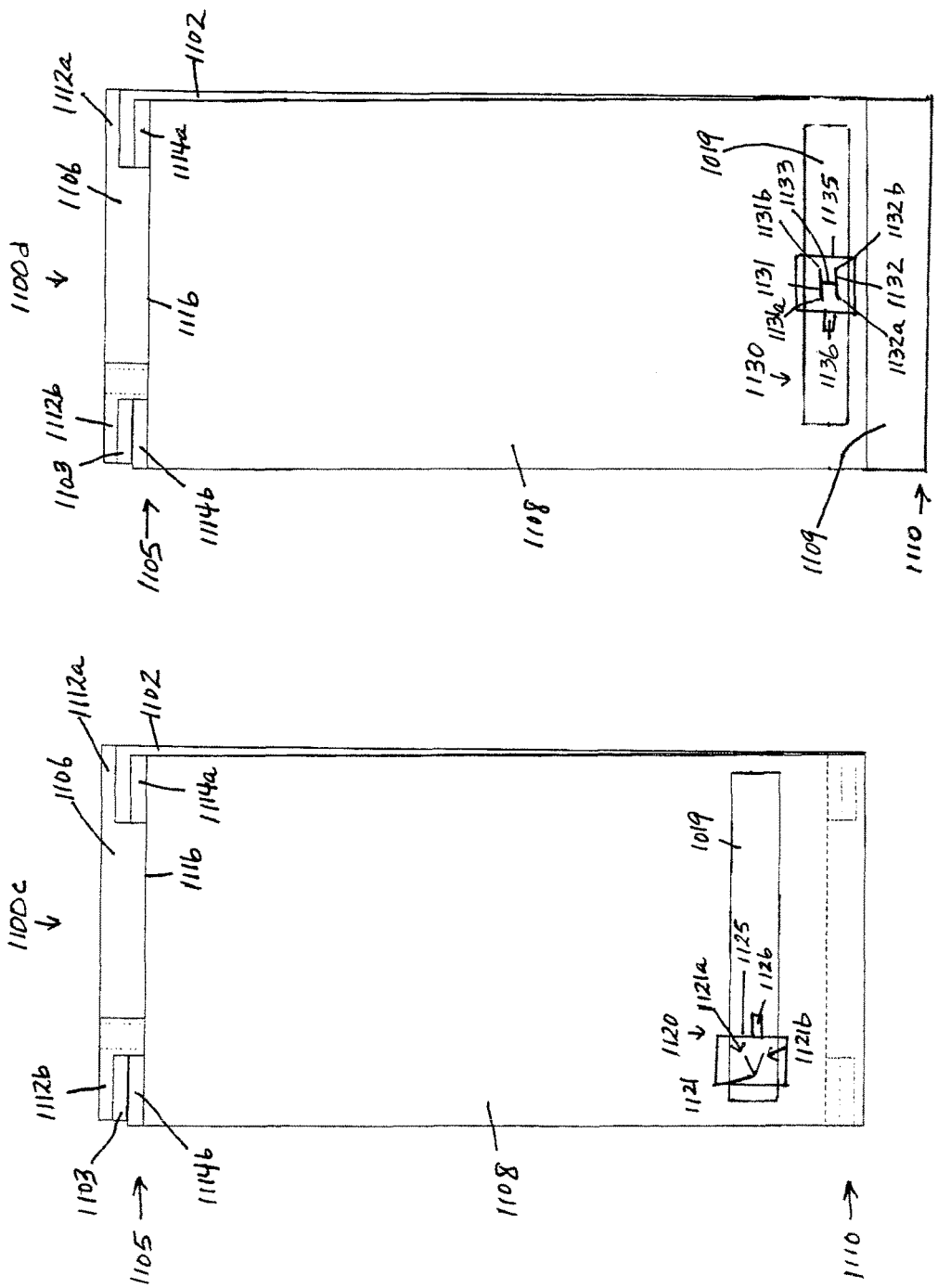

EASY OPEN PLASTIC BAGS

CROSS-REFERENCE TO RELATED APPLICATIONS

This application is a continuation-in-part of U.S. patent application Ser. No. 13/682,289, filed on Nov. 20, 2012, which is a continuation-in-part of U.S. patent application Ser. No. 13/372,211, filed on Feb. 13, 2012, each of which is incorporated herein by reference in its entirety.

STATEMENT REGARDING FEDERALLY SPONSORED RESEARCH OR DEVELOPMENT

N/A

THE NAMES OF PARTIES TO A JOINT RESEARCH AGREEMENT

N/A

INCORPORATION-BY-REFERENCE OF MATERIAL SUBMITTED ON A COMPACT DISC

N/A

BACKGROUND OF THE INVENTION

1. Field of the Invention

The present disclosure relates to plastic bags with improved opening features.

2. Background of the Invention

Conventional plastic bags of a wide variety of size and shape are used in various situations. Bulk materials, such as flour, sugar, rice, seed, animal feed, chemicals, powdered materials or the like, for example, typically have been packaged in woven plastic bags in the past. Pet food, bird seed and other products sold in retail stores typically have not been packaged in conventional woven plastic bags. Among other reasons for this, woven plastic bags were considered too rudimentary to be printed with high end graphics suitable for consumer type of packaging. In addition, the high speed requirements in the filling and packaging operations limited the use of the woven bags in these applications.

Laminated woven sacks (LWS) were developed using a woven polypropylene structure laminated to a bi-oriented polypropylene film (BOPP) that can be reverse printed with high end graphics suitable for consumer type of packaging. The LWS provides a stronger, more attractive bag than the more conventional multiwall bags used for that purpose over the last 20 years. Due to their tough strong structure, conventional LWS bags are typically sewn shut on both ends. These LWS recently met with success and have been successfully substituted for the conventional multiwall paper bags used in the pet food industry for many years.

One major drawback of the sewn LWS has been the closing of the bags at high speed filling lines, such as those for filling such bags with pet food. Experience has shown that sewing production lines are typically slower than the filling of the multiwall pinch bottom bags. Additionally, the sewn bags do not provide an aesthetically pleasing and useful clean display on the ends of the bags, thus making it difficult for consumers to identify or find a desired brand quickly when the bags are displayed on the shelves at the point of sale, such as when they are stacked on top of one another. In addition, the sewn ends required puncturing the plastic bags and thus result in a bag that is not sealed, leading to somewhat reduced shelf-life and possible infestation of the contents of the bag. Thus, there is a need for pinch laminated woven sacks that overcome these drawbacks in the filling and closing operations while allowing an attractive graphic display of the bags' ends at the retail outlet and also providing a strong, durable bag which remains sealed.

One major disadvantage of the newly developed pinch bottom laminated woven sack, however, is that it does not include an easy open feature that allows the consumer or purchaser to quickly and easily open the bag without the use of scissors or knives. There is a need for such a pinch bottom laminated woven sack which is easy to open without the use of scissors, knives or other such instruments, and also does not require the use of excessive force.

Woven plastic bags have been used and are conventional for certain applications. An example of a conventional woven plastic bag is provided in U.S. Pat. No. 4,373,979 ("the '979 patent"), issued on Feb. 15, 1983. The '979 patent describes the use of woven strips of highly longitudinally-oriented, high-density polyethylene or polypropylene in a bag construction in which the bag is formed from a seamed tube made of the woven plastic material. The seamed tube has gussets on either side and, when a portion is cut from the rest of the tube, a bag having two open, unsealed ends is provided. The '979 patent describes the use of ultrasonic spot welds to seal portions of a bag made of such woven plastic strips, as opposed to sewing the seams of a bag or using a hot melt adhesive to seal the gusset forming pleat. The '979 patent is hereby incorporated by reference herein. The '979 patent purports to be an improvement for sealing a plastic bag. As noted in the '979 patent, sewing one end tends to take longer, thus adding time to the manufacturing process. In addition, the sewn ends in a conventional bag tend to be a weak portion of the bag, and a likely location for rips, tearing, and subsequent loss of contents during storing, shipping and handling. In addition, such bags may not provide sufficient protection from infestation from vermin and/or insects.

Another example of plastic bags is disclosed in U.S. Patent Application Publication Number US 2010/0029455 A1 ("the '455 publication"), published on Feb. 4, 2010, which describes production of web sections from a flexible web material that is provided with tear-off lines produced by laser beam processing at the distance of the length of the web sections to be formed. The tear-off lines weaken the flexible web material, but do not result in complete separation of the web sections from the web material, which occurs upon tearing the flexible web material. The '455 publication is incorporated by reference herein.

More recently, some types of plastic bags have provided improvements in sealing the ends of the bags. For example, in U.S. Pat. No. 6,800,051 B2 ("the '051 patent"), issued on Oct. 5, 2004, a process for sealing side fold sacks made of plastic film is described. According to the '051 patent, a web of plastic tubular film is cut to provide a staggered detachment along a perforation so that one wall (e.g., the front wall) projects beyond the opposing wall (e.g., the back wall). The projecting portion of the first wall is then folded over and sealed to the opposing wall by means of a plastic adhesive such as a polyurethane adhesive or hot melt. The '051 patent is hereby incorporated by reference herein. However, such bags involve plastic films, not woven plastic materials, and therefore are unable to handle the weight loads of conventional bulk bags made of paper and other materials. Such bags are useful for only certain lightweight contents, such as bread.

There are a variety of conventional ways of providing for reusable openings in bags. For example, U.S. Pat. No. 6,478,465 B1 ("the '465 patent"), issued Nov. 12, 2002, describes a peelable opening in a multiwall, pinched bottom open mouth bag construction. The '465 patent also describes the use of an adhesive layer that can be used so that the bag opening is reclosable. The '465 patent is hereby incorporated by reference herein.

In other types of conventional plastic bags, such as those used in retail and grocery stores, the use of weakened portion provided by one or more perforations in the plastic bag wall is known. A number of approaches have been taken in connection with such bags, including those shown in U.S. Pat. No. 5,188,235 (the '235 patent), issued Feb. 23, 1993, as well as in U.S. Published Patent Application No. 2005/0087542 A1 (the '542 application), published Apr. 28, 2005, U.S. Pat. No. 5,979,655 (the '655 patent), issued Nov. 9, 1999, and U.S. Published Patent Application No. 2006/0072856 (the '856 application), issued Apr. 6, 2006. However, none of these bags are woven bags, let alone bags with multiple layers. The '235 patent, the '655 patent, the '542 application, and the '856 application are hereby incorporated by reference.

Typically woven and non-woven bags are sealed with a single or double fold at each end with tape over the single or double fold, stitching at both ends, or a zipper at one end and a single or double fold at the other end. However, opening woven and certain non-woven bags has proven difficult, due to the strength of the bag. Therefore, what is needed are woven and non-woven bags that are easier to open, that do not add much to the cost or time to manufacture, and are not susceptible to inadvertent tearing, punctures, breaking, or the like.

SUMMARY OF THE INVENTION

The present disclosure provides woven and non-woven plastic bags comprising an easy open feature, which makes the presently disclosed woven and non-woven plastic bags easier to open than conventional woven and non-woven plastic bags.

The present disclosure provides a bag comprising a front wall, a back wall, an interior surface, an exterior surface, a top end, a bottom end, a first layer and a second layer, each of the front wall and back wall having an interior surface, an exterior surface, a top end and a bottom end, wherein the first layer comprises a polymer and the second layer comprises a polymer attached to the first layer, and wherein the bag comprises an easy open feature located on the front wall of the bag, the back wall of the bag, or a combination thereof. The first layer can comprise a woven polymer, including, but not limited to, polypropylene, high density polyethylene, low density polyethylene, polyester, or any combination thereof. The second layer can comprise a polymeric film, including, but not limited to, polypropylene, polyethylene, polyethylene terephthalate, polyamide, or any combination thereof, or paper or coated paper portion suitable for having high quality print graphics thereon, or a combination of a polymeric film and a paper portion suitable for having high quality print graphics thereon. The second layer can alternatively comprise an oriented polymeric film, including, but not limited to, oriented polypropylene, biaxially-oriented polypropylene, oriented polyethylene, biaxially-oriented polyethylene, oriented polyethylene terephthalate, biaxially-oriented polyethylene terephthalate, oriented polyamide, biaxially-oriented polyamide, or any combination thereof. The first layer and second layer can be laminated together. Thus in certain aspects the first layer can consist or consist essentially of a woven polymer and the second layer can consist or consist essentially of a film.

In general the easy open feature comprises a weakened area. The weakened area can comprise a cut having a first end and a second end, wherein the cut penetrates through at least a portion of the front wall of the bag, the back wall of the bag, or a combination thereof. In certain aspects the cut can comprise a line or an open shape, including, but not limited to, a carat, a semi-circle, an open square, or an open rectangle. The weakened area can further comprise a plurality of perforations extending from the first end or the second end of the cut, wherein the plurality of perforations penetrate through at least a portion of the front wall of the bag, the back wall of the bag, or a combination thereof. In various aspects the plurality of perforations extends about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or about 99% of a distance across the front wall of the bag, the back wall of the bag, or a combination thereof. In certain embodiments the plurality of perforations extends from the first end of the cut to the second end of the cut. The plurality of perforations can extend around one or more walls of the bag, or can alternatively extend to form a shape, including, but not limited to, a circle, a triangle, a square or a rectangle. The shape can be comprised on a single wall of the bag, or can extend over contiguous walls of the bag. Further, a plurality of perforations can extend from the first end of the cut and a plurality of perforations can extend from the second end of the cut. The plurality of perforations can extend from the first end of the cut and the second end of the cut about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or about 99% of a distance across the front wall of the bag, the back wall of the bag, or a combination thereof, or can extend to form a shape, including, but not limited to, a circle, a triangle, a square or a rectangle. Once again, the shape can be comprised on a single wall of the bag, or can extend over contiguous walls of the bag.

The weakened area can also comprise a first cut having a first end and a second end and a second cut having a first end and a second end. In particular embodiments the first cut and the second cut intersect, for example comprising an "X" shape, or the first cut and the second cut comprise parallel lines. The weakened area can additionally comprise a third cut, and the first cut, the second cut and the third cut are connected, for example wherein the first cut, the second cut and the third cut comprise an "H" shape (or a sideways "H" shape when viewing the bag with the top end of the bag up). The weakened area can further comprise a plurality of perforations extending from the first end and the second end of the first cut, and a plurality of perforations extending from the first end and the second end of the second cut, wherein the plurality of perforations penetrate through at least a portion of the front wall of the bag, the back wall of the bag, or a combination thereof. The plurality of perforations extending from the first end and the second end of the first cut and the plurality of perforations extending from the first end and the second end of the second cut can comprise parallel lines or lines that intersect. In various embodiments the plurality of perforations can extending from the first end and the second end of the first cut and the first end and the second end of the second cut about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or about 99% of a distance across the front wall of the bag, the back wall of the bag, or a combination thereof.

The weakened area can alternatively comprise a plurality of perforations that penetrate through at least a portion of the front wall of the bag, the back wall of the bag, or a combination thereof. The plurality of perforations can form a line that extends about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or about 99% of a distance across the front wall of the bag, the back wall of the bag, or a combination thereof. The plurality of perforations can also form a shape, including, but not limited to, a circle, an oval, a triangle, a square or a rectangle. In other aspects, the plurality of perforations forms a first line and a second line, which can be about parallel and extend about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or about 99% of a distance across the front wall of the bag, the back wall of the bag, or a combination thereof. Furthermore, the weakened area can comprise a deformation in least a portion of the front wall of the bag, the back wall of the bag, or a combination thereof. For example, the weakened area can comprise a scoring mark.

The easy open feature can be comprised within the first layer or the second layer of the bag, or within the first layer and the second layer of the bag. The bag can further comprise an adhesive pull tab covering at least a portion of the easy open feature or the entire easy open feature. The adhesive pull tab can comprise a piece of tape, and can also comprise printing, for example directions for opening the easy open feature or a promotional coupon.

In certain embodiments the bottom end of the bag is sealed using conventional means. For example, at least a portion of a single fold of the bottom end of the front wall and the rear wall of the bag can be sealed to the outer surface of the front wall or rear wall of the bag, using an adhesive sealing, heat sealing, adhesive lamination, extrusion lamination, stitching, ultrasonic energy, pressure, tape, or any combination thereof. Alternatively at least a portion of a double fold of the bottom end of the front wall and the rear wall of the bag can be sealed to the outer surface of the front wall or rear wall of the bag. However, in certain aspects at least a portion of the bottom end of the rear wall, or the entire bottom end of the rear wall, projects further than the bottom end of the front wall. Thus, the portion of the bottom end of the rear wall that projects further than the bottom end of the front wall can be sealed to the outer surface of the bottom end of the front wall. Additionally, the top end of the bag can be sealed using conventional means. For example, at least a portion of a single fold of the top end of the front wall and the rear wall of the bag can be sealed to the outer surface of the front wall or rear wall of the bag, using an adhesive sealing, heat sealing, adhesive lamination, extrusion lamination, stitching, ultrasonic energy, pressure, tape, or any combination thereof. Alternatively at least a portion of a double fold of the top end of the front wall and the rear wall of the bag can be sealed to the outer surface of the front wall or the rear wall of the bag. However, in certain aspects at least a portion of the top end of the rear wall, or the entire top end of the rear wall, projects further than the top end of the front wall. Thus, the portion of the top end of the rear wall that projects further than the top end of the front wall can be sealed to the outer surface of the bottom end of the front wall. The top end and/or the bottom end of the bag can also comprise stitching there through.

In certain embodiments the bag further comprises a first side wall having an interior surface, an exterior surface, a top end and a bottom end, and a second side wall having an interior surface, an exterior surface, a top end and a bottom end. The first side wall and/or the second side wall can comprise gussets. In certain aspects at least a portion of the bottom end of the rear wall projects further than the bottom end of the first side wall, the bottom end of the second side wall, and the bottom end of the front wall. In an exemplary way to seal the bottom end of such bags, the portion of the bottom end of the rear wall that projects further than the bottom end of the first side wall, the bottom end of the second side wall, and the bottom end of the front wall can be sealed to the outer surface of the bottom end of the front wall. In additional aspects at least a portion of the top end of the front wall projects further than the top end of the first side wall, the top end of the second side wall and the top end of the rear wall. In these aspects the portion of the top end of the bag that projects further than the top end of the first side wall, the top end of the second side wall and the top end of the rear wall can be sealed to the outer surface of the top end of the rear wall.

Alternatively a portion of the bottom end of the rear wall can project further than the bottom end of the first side wall and the bottom end of the second side wall, and a portion of the bottom end of the first side wall and the bottom end of the second side wall can project further than the bottom end of the front wall. In an exemplary way to seal the bottom end of such bags, the portion of the bottom end of the rear wall that projects further than the bottom end of the first side wall and the bottom end of the second side wall, and the portion of the bottom end of the first side wall and the bottom end of the second side wall that projects further than the bottom end of the front wall can be sealed to the outer surface of the bottom end of the front wall. In further aspects at least a portion of the top end of the front wall projects further that the top end of the first side wall and the top end of the second side wall, and the top end of the first side wall and the top end of the second side wall project further than the top end of the rear wall. In these aspects the portion of the front wall that projects further than the top end of the first side wall and the top end of the second side wall, and the portion of the top end of the first side wall and the top end of the second side wall that projects further than the top end of the rear wall can be sealed to the outer surface of the top end of the rear wall. In particular embodiments the top end and the bottom end of the bag are sealed, as set forth above, and the bag comprises at least ten pounds by weight of a bulk item. In certain aspects such sealed bags can comprise six printable surfaces.

Additionally the bag can further comprise a third layer comprising a polymer positioned between the first layer and the second layer. The third layer can comprise a woven polymer, including, but not limited to, polypropylene, high density polyethylene, low density polyethylene, polyester, or any combination thereof. The third layer can alternatively comprise a polymeric film, including, but not limited to, polypropylene, polyethylene, polyethylene terephthalate, polyamide, or any combination thereof. The third layer can further comprises an oriented polymeric film, including, but not limited to, oriented polypropylene, biaxially-oriented polypropylene, oriented polyethylene, biaxially-oriented polyethylene, oriented polyethylene terephthalate, biaxially-oriented polyethylene terephthalate, oriented polyamide, biaxially-oriented polyamide, or any combination thereof.

The present disclosure additionally provides a bag comprising a front wall, a back wall, a first side wall, a second side wall, an interior surface, an exterior surface, a top end, a bottom end, a first layer and a second layer, the front wall, back wall, first side wall and second side wall having an interior surface, an exterior surface, a top end and a bottom end, wherein the first layer comprises a polymer and the second layer comprises a polymer attached to the first layer, and wherein the bag comprises an easy open feature located on the front wall of the bag, the back wall of the bag, the first side wall of the bag, the second side wall of the bag, or any combination thereof. The easy open feature can be located on the front wall, the back wall, the first side wall, the second side wall, or any combination thereof.

The present disclosure also provides a bag comprising a front wall, a back wall, an interior surface, an exterior surface, a top end, a bottom end and a first layer, each of the front wall and back wall having an interior surface, an exterior surface, a top end and a bottom end, wherein the first layer comprises a woven polymer, and wherein the bag comprises an easy open feature located on the front wall of the bag, the back wall of the bag, or a combination thereof. The first layer can comprise polypropylene, high density polyethylene, low density polyethylene, polyester, or any combination thereof. The bag can further comprise a second layer, which can comprise a polymeric film.

The present disclosure further provides a method of making an easy open feature in a woven polymer bag, comprising creating a weakened area in the woven polymer bag. The step of creating a weakened area can further comprise making a cut, a plurality of perforations, or scoring a line in a portion of the bag surface.

The present disclosure provides bags comprising a front wall, a back wall, an interior surface, an exterior surface, a top end, a bottom end, a first layer and a second layer, each of the front wall and back wall having an interior surface, an exterior surface, a top end and a bottom end, wherein the first layer comprises a woven polymer and the second layer comprises a film attached to the first layer, and wherein the bag comprises an easy open feature comprising a cover with a first weakened area, the easy open feature located over a second weakened area on the front wall of the bag, the back wall of the bag, or a combination thereof. In certain embodiments the first layer comprises polypropylene, high density polyethylene, low density polyethylene, polyester, or any combination thereof. In other embodiments at least a portion of the second layer comprises a printed area thereon. In further embodiments the second layer comprises polypropylene, polyethylene, polyethylene terephthalate, polyamide, or any combination thereof or paper. In yet further embodiments the second layer comprises oriented polypropylene, biaxially-oriented polypropylene, oriented polyethylene, biaxially-oriented polyethylene, oriented polyethylene terephthalate, biaxially-oriented polyethylene terephthalate, oriented polyamide, biaxially-oriented polyamide, coated paper or any combination thereof. In additional embodiments the bags further comprise a third layer between said first layer and said second layer. In particular embodiments the third layer is an adhesive. In yet other embodiments the first layer and second layer are laminated together. In still other embodiments the first layer, second layer and third layer are laminated together.

In certain embodiments the easy open feature comprises a cover having a first surface and a second surface and an adhesive on at least a portion of the first surface, the second surface, or both. In some embodiments the first and/or second weakened area comprises a cut having a first end and a second end, wherein the cut penetrates through at least a portion of the bag or cover. In particular embodiments the cut comprises a carat, a semi-circle, an open square, or an open rectangle. In further embodiments the first and/or second weakened area further comprises a second cut having a first end and a second end. In other embodiments the first cut and the second cut intersect. In yet other embodiments the first cut and the second cut comprise an "X" shape. In yet further embodiments the first cut and the second cut comprise parallel lines. In still further embodiments the first and/or second weakened area further comprises a third cut. In some embodiments the first cut, the second cut and the third cut comprises an "H" shape. In some embodiments the bags further comprise a plurality of perforations extending from the first end and/or the second end of the cut, wherein the plurality of perforations penetrate through at least a portion of the bag or cover. In certain embodiments the plurality of perforations extends about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or about 99% of a distance across the bag or cover.

In further embodiments the first and/or second weakened area comprises a plurality of perforations that penetrate through at least a portion of the bag or cover. In particular embodiments the plurality of perforations forms a line. In some embodiments the plurality of perforations extends about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or about 99% of a distance across the bag or cover. In other embodiments the plurality of perforations defines a shape. In yet other embodiments the plurality of perforations defines a first line and a second line.

In certain other embodiments the first and/or second weakened area comprises a deformation in least a portion of the bag or cover. In further embodiments the first or second weakened area further comprises a scoring mark. In other embodiments the first weakened area comprises a cut having a first end and a second end or a plurality of perforations, wherein the cut or plurality of perforations penetrates through at least a portion of the cover, or a deformation in least a portion of the cover, and the second weakened area comprises a cut having a first end and a second end or a plurality of perforations, wherein the cut or plurality of perforations penetrates through at least a portion of the bag, or a deformation in least a portion of the bag.

In additional embodiments the cover comprises a polymer, a film, an adhesive, a paper, or any combination thereof. In certain embodiments the bags further comprise a second cover covering at least a portion of the weakened area of the cover. In particular embodiments the second cover covers the entire weakened area of the cover. In further embodiments the second cover comprises a polymer, a film, an adhesive, a paper, or any combination thereof. In other embodiments the cover and the second cover comprise the same material, width, color, transparency or strength as the second cover, while in yet other embodiments the cover and the second cover comprise a different material, width, color, transparency or strength as the second cover. In some embodiments the second cover comprises a piece of tape. In additional embodiments the second cover comprises printing, such as when the second cover comprises a coupon.

In certain embodiments a single fold of the bottom end of the front wall and the rear wall of the bag is sealed to the outer surface of the front wall of the bag. In other embodiments the bottom end of the bag is sealed using an adhesive sealing, heat sealing, adhesive lamination, extrusion lamination, stitching, ultrasonic energy, pressure, tape, or any combination thereof. In further embodiments a double fold of the bottom end of the front wall and the rear wall of the bag is sealed to the outer surface of the front wall of the bag. In additional embodiments at least a portion of the bottom end of the rear wall projects further than the bottom end of the front wall. In such embodiments the portion of the bottom end of the rear wall that projects further than the bottom end of the front wall can be sealed to the outer surface of the bottom end of the front wall.

In additional embodiments the bags further comprise a first side wall having an interior surface, an exterior surface, a top end and a bottom end, and a second side wall having an interior surface, an exterior surface, a top end and a bottom end, wherein the first side wall and the second side wall further comprise gussets. In further embodiments at least a portion of the bottom end of the rear wall projects further than the bottom end of the first side wall, the bottom end of the second side wall, and the bottom end of the front wall. In yet further embodiments the portion of the bottom end of the rear wall that projects further than the bottom end of the first side wall, the bottom end of the second side wall, and the bottom end of the front wall is sealed to the outer surface of the bottom end of the front wall. In other embodiments at least a portion of the bottom end of the rear wall projects further than the bottom end of the first side wall and the bottom end of the second side wall, and the bottom end of the first side wall and the bottom end of the second side wall project further than the bottom end of the front wall, and wherein the portion of the bottom end of the rear wall that projects further than the bottom end of the first side wall and the bottom end of the second side wall, and the portion of the bottom end of the first side wall and the bottom end of the second side wall that project further than the bottom end of the front wall are sealed to the outer surface of the bottom end of the front wall. In still other embodiments at least a portion of the top end of the front wall projects further than the top end of the first side wall and the top end of the second side wall, and the top end of the first side wall and the top end of the second side wall project further than the top end of the rear wall.

In particular embodiments the top end and the bottom end of the bag are sealed, and the bag comprises at least ten pounds by weight of a filling material. In further embodiments the bags further comprise a fourth layer comprising a polymer between the first layer and the second layer. In certain embodiments the fourth layer comprises a woven polymer, including, but not limited to, polypropylene, high density polyethylene, low density polyethylene, polyester, or any combination thereof. In other embodiments the fourth layer comprises a polymeric film, including, but not limited to, polypropylene, polyethylene, polyethylene terephthalate, polyamide, or any combination thereof. In additional embodiments at least portions of the exterior surfaces of each of the front wall and the back wall comprise a plurality of discrete areas further comprising printing thereon. In certain other embodiments a portion of the front wall and a portion of the back wall combine to form a discrete portion of the bag located at or near either the top end or the bottom end, wherein the discrete portion of the bag comprises printing thereon. In yet other embodiments at least a portion of the front wall or the back wall projects beyond a corresponding portion of the other, thereby defining a pinch bottom bag at the top end or the bottom end of the bag.

The present disclosure further provides methods of making a woven polymer bag with an easy open feature, comprising attaching a cover with a first weakened area over a second weakened area of the woven polymer bag. In certain embodiments the first and/or second weakened area is a cut, a plurality of perforations, or a scoring line. The present disclosure additionally provides bags comprising a front wall, a back wall, a first side wall, a second side wall, an interior surface, an exterior surface, a first end, a second end, a first layer and a second layer, the front wall, back wall, first side wall and second side wall having an interior surface, an exterior surface, a first end and a second end, wherein the first layer comprises a woven polymer and the second layer comprises a film laminated to the first layer, wherein the first end of the front wall projects further than the first end of the first side wall and the first end of the second side wall, and the first end of the first side wall and the first end of the second side wall projects further than the first end of the back wall, wherein the bag comprises printing on the front wall, the first side wall, the back wall, the second side wall, the first end, the second end, or any combination thereof, and wherein the bag comprises an easy open feature comprising a cover comprising a first weakened area located over a second weakened area on the front wall of the bag, the back wall of the bag, the first side wall of the bag, the second side wall of the bag, or any combination thereof, and a second cover located over the first weakened area of the cover.

The present disclosure also provides bags comprising a front wall, a back wall, a first side wall, a second side wall, an interior surface, an exterior surface, a first end, a second end, a first layer and a second layer, the front wall, back wall, first side wall and second side wall having an interior surface, an exterior surface, a first end and a second end, wherein the first layer comprises a woven polymer and the second layer comprises a film laminated to the first layer, wherein the first end of the front wall projects further than the first end of the first side wall and the first end of the second side wall, and the first end of the first side wall and the first end of the second side wall projects further than the first end of the back wall, wherein the bag comprises printing on the front wall, the first side wall, the back wall, the second side wall, the first end, the second end, or any combination thereof, and wherein the bag comprises a weakened area on the front wall of the bag, the back wall of the bag, the first side wall of the bag, the second side wall of the bag, or any combination thereof, and a cover located over the weakened area of the bag.

The present disclosure also provides a bag comprising a front wall, a back wall having a first portion and a second portion, an interior surface, an exterior surface, a first end, a second end, a first layer and a second layer, each of the front wall and the first and second portions of the back wall having an interior surface, an exterior surface, a first side, a second side, a first end and a second end, wherein the first layer comprises a woven polymer and the second layer comprises a polymer film attached to the first layer, and wherein the bag comprises an easy open feature comprising a weakened area on the front wall of the bag, the back wall of the bag, or a combination thereof, the weakened area comprising a central portion comprising a first end and a second end, a first side portion comprising a first end and a second end located proximal to the first end of the central portion, a second side portion comprising a first end located proximal to the second end of the central portion and a second end, a first end portion located proximal to the first end of the first side portion, and a second end portion located proximal to the second end of the second side portion. In certain embodiments the second end of the first side portion is attached to the first end of the central portion, and the first end of the second side portion is attached to the second end of the central portion. In further embodiments the first end portion is attached to the first end of the first side portion, and the second end portion is attached to the second end of the second side portion.

In certain embodiments the weakened area comprises a cut, while in other embodiments the weakened area comprises a plurality of cuts and/or a plurality of perforations. In particular embodiments the weakened area comprises at least a first cut and a plurality of perforations. In some embodiments the weakened area penetrates through at least a portion of the first layer of the bag, while in other embodiments the weakened area penetrates through at least the first layer of the bag, through the first layer and at least a portion of the second layer of the bag or through the first layer and the second layer of the bag.

In certain embodiments the central portion defines a curve. In further embodiments the curve comprises a concave portion with respect to the first end or the second end of the bag. In other embodiments the central portion defines a carat. In additional embodiments the carat opens toward the first end or the second end of the bag. In particular embodiments the first side portion and the second side portion each define a line extending downward with respect to the first end of the bag. In alternative embodiments the first side portion and the second side portion each define a line extending upward with respect to the first end of the bag. In such embodiments an acute angle can be defined by the first side portion and the second side portion, a right angle can defined by the first side portion and the second side portion, or an obtuse angle can be defined by the first side portion and the second side portion. In some embodiments the first end portion and/or the second end portion define a curve, the first end portion and/or the second end portion define a carat, the first end portion and/or the second end portion define a line, or combinations thereof.

In certain embodiments the bag further comprises a cover over the easy open feature, the cover comprising a top end, a bottom end, a first side, a second side, a first portion and a second portion, the second portion of the cover comprising a pull tab. In some embodiments the pull tab is located in a corner proximal the top end and the first side of the cover. In other embodiments the pull tab is located along at least a portion of the first side of the cover. In various embodiments the pull tab defines a curve, a rectangle, a carat or a triangle. In further embodiments the first portion of the cover comprises an adhesive. In still further embodiments the first portion of the cover and the second portion of the cover comprise an adhesive. In particular embodiments the first portion of the cover comprises an increased tensile pull-off adhesion strength compared to the second portion of the cover. In additional embodiments the second portion of the cover comprises a fold. In additional embodiments the bag comprises a coating under the second portion of the cover. In still other embodiments the cover comprises a weakened area. In yet other embodiments the first portion of the cover comprises a weakened area.

In some embodiments the cover is adapted to remove no portion of the bag upon opening and/or removal of the cover to expose the easy open feature. In other embodiments the first end portion is adapted to retard opening of the bag at the first end of the first side portion and the second end portion is adapted to retard opening of the bag at the second end of the second side portion. In further embodiments the first end portion is adapted to prevent or reduce fraying of the bag at the first end of the first side portion upon opening, and the second end portion is adapted to prevent or reduce fraying of the bag of the bag at the second end of the second side portion upon opening. In additional embodiments the first and second side portions comprise a plurality of portions having different strengths.

In certain embodiments the weakened area extends about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or about 99% of a distance across the front wall of the bag, the back wall of the bag, or a combination thereof. In additional embodiments the weakened area extends between about 5% and about 95%, about 10% and about 90%, about 15% and about 85%, about 20% and about 80%, about 25% and about 75%, about 30% and about 70%, about 35% and about 65%, about 40% and about 60%, or about 45% and about 55% of a distance across the front wall of the bag, the back wall of the bag, or a combination thereof. In some embodiments each of the first end and the second end of the bag are closed, and the bag comprises at least about 10 pounds, about 14 pounds, about 15 pounds, about 20 pounds, about 22 pounds, about 25 pounds, about 30 pounds, about 35 pounds, about 40 pounds, about 45 pounds, about 50 pounds, about 55 pounds, about 60 pounds, about 65 pounds, about 70 pounds, about 75 pounds, about 80 pounds, about 85 pounds, about 90 pounds, about 95 pounds or about 100 pounds by weight of a filling material. In further embodiments the first end of the bag defines a panel comprising printing and the second end of the bag defines a panel comprising printing.

In other embodiments the bag further comprises a first side wall comprising a first side, a second side, a first end and a second end, and a second side wall comprising a first side, a second side, a first end and a second end, the first side of the first side wall attached to the second side of the second portion of the back wall, the second side of the first side wall attached to the first side of the front wall, the first side of the second side wall attached to the second side of the front wall, and the second side of the second side wall attached to the first side of the first portion of the back wall.

The present disclosure also provides a process for forming an easy open feature in a bag comprising at least a first woven layer, comprising introducing a cut, a plurality of cuts, or a plurality of perforations on the bag during production of the bag, wherein the bag remains in motion during introduction of the cut, plurality of cuts or plurality of perforations.

It is an object of the invention to provide a woven plastic bag that is stronger than bags made of plastic films, and yet easier to open than conventional woven bags.

It is another object of the invention to provide a woven plastic bag that includes an easy open feature and still provides strength and durability, reducing the potential for tearing, damage, infestation, and loss of contents.

It is still another object of the invention to provide a woven bag that can be manufactured more quickly and therefore is less costly than conventional bags, and that has an easy open feature that makes opening the woven bag easier than opening conventional woven bags.

It is still another object of the invention to provide a woven polymeric bag that provides an attractive high end graphic display on at least one end of the bags when are displayed or presented at the point of sale.

It is an additional object of the invention to provide a woven plastic bag that includes an easy open feature that prevents or reduces fraying upon opening the bag, thereby reducing or eliminating contamination of the contents of the bag with dislodged frayed portions of the bag.

These and other objects of the invention will be apparent to those skilled in the art from the following detailed description.

BRIEF DESCRIPTION OF THE DRAWINGS

FIG. 1 shows a bag with an easy open feature comprising a square cut through the bag located near the top end of the bag according to one embodiment of the present disclosure.

FIG. 2 shows a bag with an easy open feature comprising a carat cut through the bag located near the bottom end of the bag according to one embodiment of the present disclosure.

FIG. 3 shows a bag with an easy open feature comprising a semi-circular cut through the bag located near the top end of the bag according to one embodiment of the present disclosure.

FIG. 4 shows a pull tab comprising a promotional coupon according to one embodiment of the present disclosure.

FIG. 5 shows a bag with an easy open feature comprising a square cut through the bag located near the bottom end of the bag according to one embodiment of the present disclosure.

FIG. 6 shows a pinch cut bag with an easy open feature comprising a square cut through the bag located near the bottom end of the bag according to one embodiment of the present disclosure.

FIG. 7 shows a pinch cut bag with an easy open feature comprising a square cut through the bag located near the top end of the bag according to one embodiment of the present disclosure.

FIG. 9 shows an outline of a pinch cut bag with an easy open feature comprising a square cut through the bag located near the top end of the front panel of the bag according to one embodiment of the present disclosure.

FIG. 10 shows an outline of a pinch cut bag with an easy open feature comprising a carat cut through the bag located near the top end of a side panel of the bag and extending through the side panel according to one embodiment of the present disclosure.

FIG. 11 shows an outline of a pinch cut bag with an easy open feature comprising a carat cut through the bag located near the top end of a side panel of the bag and extending across the entire length of the bag according to one embodiment of the present disclosure.

FIG. 12 shows an outline of a pinch cut bag with an easy open feature comprising a carat cut through the bag located near the top end of a side panel of the bag and extending across the side panel and the front panel of the bag according to one embodiment of the present disclosure.

FIG. 13 shows an outline of a pinch cut bag with an easy open feature comprising a bidirectional square cut through the bag located near the top end of the front panel of the bag and extending into both side panels according to one embodiment of the present disclosure.

FIG. 14 shows a back side view of a pinch cut bag according to one embodiment of the present disclosure.

FIG. 15 shows a front side view of a printed pinch cut bag with an easy open feature comprising a square cut through the bag located near the top end of the bag according to one embodiment of the present disclosure.

FIG. 18 shows a flush cut bag with an easy open feature comprising a cover located near the bottom end of the bag with an "H" cut through the cover according to one embodiment of the present disclosure.

FIG. 19 shows a bag with an easy open feature comprising a cover located near the bottom end of the bag with a carat cut through the cover according to one embodiment of the present disclosure.

FIG. 22 shows a pinch cut bag with an easy open feature comprising a cover located near the bottom end of the bag having a full cut in the shape of a triangle or carat through the cover according to one embodiment of the present disclosure.

FIG. 23 shows a bag with an easy open feature comprising a cover located near the bottom end of the bag having an "H" cut through the cover according to one embodiment of the present disclosure.

FIG. 24 shows a pinch cut bag with an easy open feature comprising first cover located near the bottom end of the bag having a full cut in the shape of a triangle or carat through the first cover and a second cover over the full cut according to one embodiment of the present disclosure.

FIG. 25 shows a bag with an easy open feature comprising a first cover located near the bottom end of the bag having an "H" cut through the first cover and a second cover over the "H" cut according to one embodiment of the present disclosure.

As shown in FIG. 26 each of the central curved portion, first and second side portions and first and second end portions comprise cuts.

As shown in FIG. 27 each of the central curved portion, first and second side portions and first and second end portions comprise cuts.

As shown in FIG. 28 each of the central curved portion, first and second side portions and first and second end portions comprise cuts.

As shown in FIG. 29 each of the central curved portion, and first and second side portions comprise a plurality of cuts.

As shown in FIG. 30 each of the central curved portion, first and second side portions and first and second end portions comprise a plurality of perforations.

As shown in FIG. 31 each of the central curved portion, first and second side portions and first and second end portions comprise cuts.

As shown in FIG. 32 each of the central carat portion, first and second side portions and first and second end portions comprise cuts.

As shown in FIG. 33 each of the central curved portion, first and second side portions and first and second end portions comprise cuts.

As shown in FIG. 34 each of the central curved portion, first and second side portions and first and second carat-shaped end portions comprise cuts.

As shown in FIG. 35 each of the central curved portion, first and second side portions and first and second carat-shaped end portions comprise cuts.

As shown in FIG. 36 each of the central curved portion, first and second side portions and first and second end portions comprise cuts.

As shown in FIG. 37 each of the central curved portion, first and second side portions and first and second end portions comprise cuts.

As shown in FIG. 38 each of the central curved portion, first and second side portions and first and second end portions comprise cuts.

As shown in FIG. 39 each of the central curved portion, first and second side portions and first and second end portions comprise cuts.

As shown in FIG. 40 each of the central curved portion, first and second side portions and first and second end portions comprise cuts.

As shown in FIG. 41 each of the central curved portion, first and second side portions and first and second end portions comprise cuts.

DETAILED DESCRIPTION OF THE PREFERRED EMBODIMENT

Figure 8:
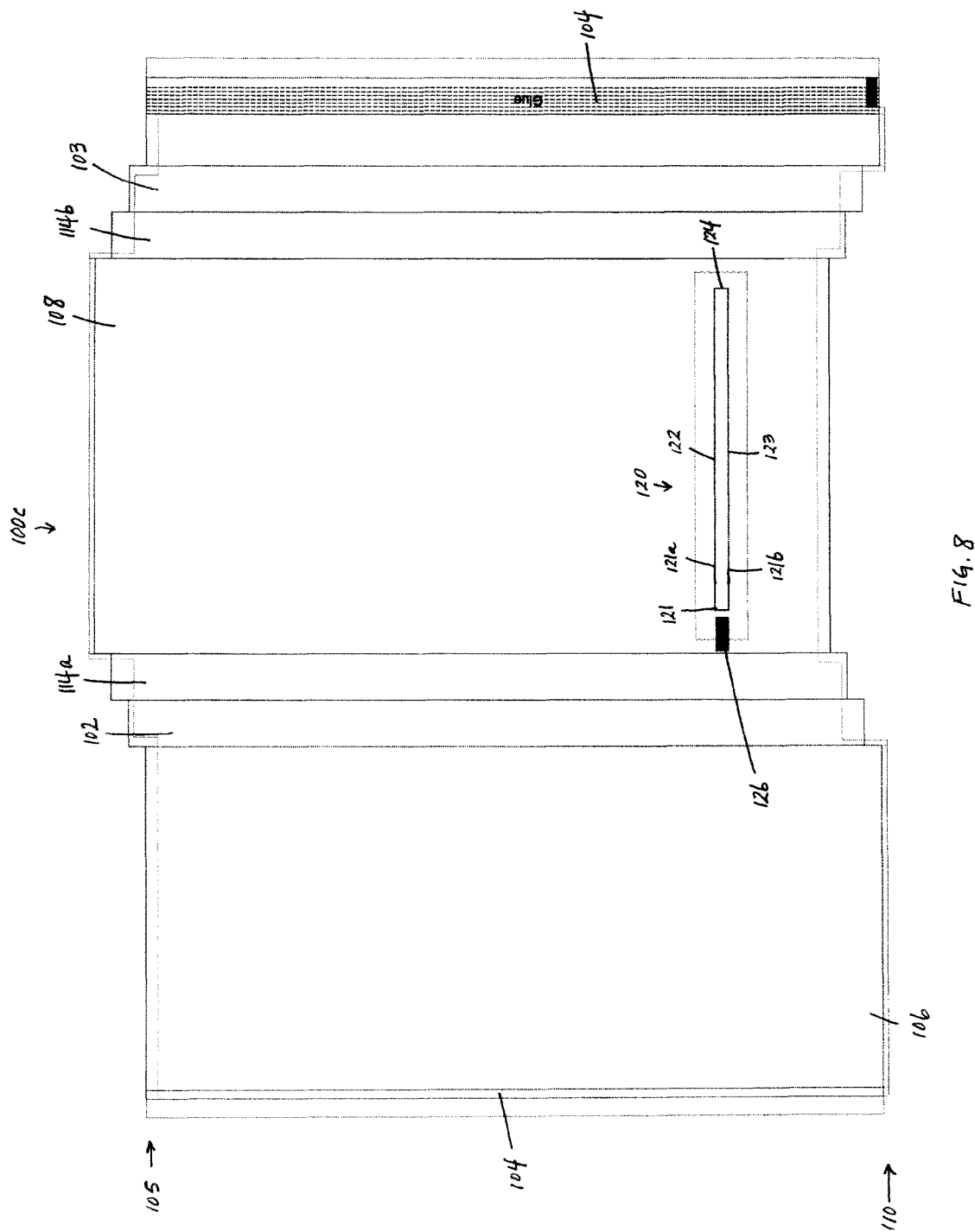
FIG. 8 shows an outline of a pinch cut bag with an easy open feature comprising a square cut through the bag located near the bottom end of the front panel of the bag according to one embodiment of the present disclosure.

Referring first to FIG. 1, the front side view of an embodiment of a bag 1a is shown. Bag 1a has a front wall 10, a back wall 11, a first side wall 12, a second side wall 13, a top end 14, and a bottom end 15. It will be apparent, however, that the orientation of the bag ends 14 and 15 is unimportant and the "top" and "bottom" references are useful but may change depending on the orientation one views the bag. As shown in FIG. 1 the top end 14 is considered a "flush cut" because the top ends of the front wall 10 and the back wall 11 are cut so that the top ends of the front wall 10 and the back wall 11 are essentially "flush" with one another; they have substantially the same length. Additionally, as shown in FIG. 1 the bottom end 15 is considered a "pinch cut" because the bottom end of the front wall 10 is longer than the bottom end of the back wall 11. Bag 1a also comprises an easy open feature 20 near the top end 14 of the bag 1a, which in this embodiment comprises a full cut 21 in a rectangular shape having a first end 21a and a second end 21b through the front wall 10 of bag 1a, a first row of perforations 22 extending from the first end 21a of the cut 21, a second row of perforations 23 extending from the second end 21b of the cut 21, an optional third row of perforations 24 connecting the end of the first row of perforations 22 and the second row of perforations 23, a cover 25 over the cut 21 and the rows of perforations 22, 23 and 24, and a pull tab 26 attached to the cover 25. Although in this embodiment the easy open feature 20 is located near the top end 14 of the bag 1a and the pull tab is located close to the second side wall 13, the skilled artisan will realize that the easy open feature 20 could also be in the opposite orientation, with the pull tab located closer to the first side wall 12, reside in either orientation near the bottom end 15 of the front wall 10 of bag 1a, or reside in either orientation near the top end 14 or bottom end 15 on the back wall 11 of the bag 1a. The full cut 21 can be formed by punching, cutting, or through the use of a laser, or by any other technique known to those skilled in the art. The easy open feature 20 (in this embodiment the cut 21 and/or first 22 or second 23 row of perforations) provides a portion of bag 1a that is weakened. This weakened portion can be opened with less force than required to open or tear other portions of the bag 1a.

Bag 1a can be opened by pulling the pull tab 26, which removes the cover 25 and the portion of bag 1a defined by the cut 21 and the first, second, and third row of perforations 22, 23, and 24, respectively. Although not shown in this embodiment, it will be understood that the full cut 21 can be larger or smaller, and can extend to a greater or lesser extent, and the first and second rows of perforations 22 and 23, respectfully, can extend any distance from the first end and second end, respectively, of the cut toward the opposite side wall of the bag, for example 50%, 75%, 90% or about 100% of the distance from the ends of the cut to the opposite side of the bag. In addition, although not shown in this embodiment, the cover 25 can cover less than the full extent of the first and second rows of perforations, whatever distance the rows of perforations extend across the front wall of the bag, and in certain embodiments covers only the full cut portion of the easy open feature 20. The cover can comprise a polymer, a film, an adhesive, paper, or any combination thereof. Although not shown in FIG. 1, the cut 21 and the first, second, and third row of perforations 22, 23, and 24 can comprise a first cover and a second cover, or a plurality of covers. Additionally, the pull tab 26 can comprise black and white and/or color printing (not shown), for example a coupon (not shown), and can also be used to reclose the bag.

Referring to FIG. 2, the front side view of another embodiment of a bag 1b is shown. Bag 1b also has a front wall 10, a back wall 11, a first side wall 12, a second side wall 13, a flush cut top end 14, and a pinch cut bottom end 15. Bag 1b also comprises an easy open feature 20, which in this embodiment is near the bottom end 15 of the bag 1b and comprises a full cut 21 in a triangular or carat shape having a first end 21a and a second end 21b through the front wall 10 of bag 1b, a first row of perforations 22 extending from the first end 21a of the cut 21, a second row of perforations 23 extending from the second end 21b of the cut 21, an optional third row of perforations 24 connecting the end of the first row of perforations 22 and the second row of perforations 23, a cover 25 over the cut and the rows of perforations, and a pull tab 26 attached to the cover 25.

Referring to FIG. 3, the front side view of yet another embodiment of a bag 1c is shown. Bag 1c also has a front wall 10, a back wall 11, a first side wall 12, a second side wall 13, a flush cut top end 14, and a pinch cut bottom end 15. Bag 1c also comprises an easy open feature 20, which in this embodiment is near the top end 14 of the bag 1c and comprises a full cut 21 in a semi-circular shape having a first end 21a and a second end 21b through the front wall 10 of bag 1c, a first row of perforations 22 extending from the first end 21a of the cut 21, a second row of perforations 23 extending from the second end 21b of the cut 21, an optional third row of perforations 24 connecting the end of the first row of perforations 22 and the second row of perforations 23, a cover 25 over the cut and the rows of perforations, and a pull tab 26 attached to the cover 25.

Referring to FIG. 4, an alternate embodiment of a cover 25 and pull tab 26 is shown, where the cover 25 is over the full cut 21 in a semi-circular shape having a first end 21a and a second end 21b, but does not cover the full extent of the first row of perforations 22 and the second row of perforations 23, and does not cover the third row of perforations 24. In this embodiment, the pull tab 26 includes instructions to open the bag, but can also comprise black and white and/or color printing (not shown), for example a promotional coupon (not shown).

Referring to FIG. 5, the front side view of still another embodiment of a bag 1d is shown. Bag 1d also has a front wall 10, a back wall 11, a first side wall 12, a second side wall 13, a flush cut top end 14, and a pinch cut bottom end 15. Bag 1d also comprises an easy open feature 20, which in this embodiment is near the bottom end 15 of the bag 1d and comprises a full cut 21 in a rectangular shape having a first end 21a and a second end 21b through the front wall 10 of bag 1d, a first row of perforations 22 extending from the first end 21a of the cut 21, a second row of perforations 23 extending from the second end 21b of the cut 21, an optional third row of perforations 24 connecting the end of the first row of perforations 22 and the second row of perforations 23, a cover 25 over the cut and the rows of perforations, and a pull tab 26 attached to the cover 25.

Referring to FIG. 6, the front side view of one embodiment of a "pinch cut" bag 100a is shown. As shown in FIG. 6, the bag 100a has a pinch cut first or top end 105 and a pinch cut second or bottom end 110. Once again, it will be apparent, however, that the orientation of the bag ends 105 and 110 is unimportant and the "top" and "bottom" references are useful but may change depending on the orientation one views the bag. The bag 100a has a front wall or surface 108 with top end 116, a rear wall or surface 106, and two side walls 102 and 103. Those skilled in the art will appreciate that conventional techniques can be used to provide side gussets in the bag 100a for each of sides 102 and 103 during this forming process. The first end 105 of bag 100a has portions 112a and 112b of the rear wall or surface 108 of the bag that extend further from the body of the bag 100a than do portions 114a and 114b of the material of bag 100a forming the side gussets for sides 102 and 103. In addition, the portions 114a and 114b of the side gussets extend further from the body of the bag 100a than the top end 116 of the front wall 108 of the bag 100a. As shown in FIG. 6, the front wall 108 of the bag 100a has an end portion 116 at the first end 105 of the bag that does not extend as far from the body of the bag 100a as the end portions 114a and 114b of the side gussets or the end portions 112a and 112b of the rear wall of the first end 105 of the bag 100a. Bag 100a also comprises an easy open feature 120 near the top end 105 of the bag 100a, which in this embodiment comprises a full cut 121 in a rectangular shape having a first end 121a and a second end 121b through the front wall 108 of bag 100a, a first row of perforations 122 extending from the first end 121a of the cut 121, a second row of perforations 123 extending from the second end 121b of the cut 121, an optional third row of perforations 124 connecting the end of the first row of perforations 122 and the second row of perforations 123, a cover 125 over the cut and the rows of perforations, and a pull tab 126 attached to the cover 125.

Referring to FIG. 7, the front side view of another embodiment of a "pinch cut" bag 100b is shown. As shown in FIG. 7, the bag 100b has a pinch cut first or top end 105 and a pinch cut second or bottom end 110. The bag 100b has a front wall or surface 108 with top end 116, a rear wall or surface 106, and two side walls 102 and 103. The first end 105 of bag 100b has portions 112a and 112b of the rear wall or surface 108 of the bag that extend further from the body of the bag 100b than do portions 114a and 114b of the material of bag 100 forming the side gussets for sides 102 and 103. In addition, the portions 114a and 114b of the side gussets extend further from the body of the bag 100b than the top end 116 of the front wall 108 of the bag 100b. As shown in FIG. 7, the front wall 108 of the bag 100b has an end portion 116 at the first end 105 of the bag that does not extend as far from the body of the bag 100b as the end portions 114a and 114b of the side gussets or the end portions 112a and 112b of the rear wall of the first end 105 of the bag 100b. Bag 100b also comprises an easy open feature 120, which in this embodiment is near the bottom end 110 of the bag 100b and comprises a full cut 121 in a rectangular shape having a first end 121a and a second end 121b through the front wall 108 of bag 100b, a first row of perforations 122 extending from the first end 121a of the cut 121, a second row of perforations 123 extending from the second end 121b of the cut 121, an optional third row of perforations 124 connecting the end of the first row of perforations 122 and the second row of perforations 123, a cover 125 over the cut and the rows of perforations, and a pull tab 126 attached to the cover 125.

Referring to FIG. 8, a planar view of an embodiment of a substantially flat sheet of material from which a "pinch cut" bag 100c is to be formed is shown. Shown on the sheet are front wall 108, rear wall 106, first side 102 having gusset portion 114a, second side 103 having gusset portion 114b, seam 104, top end 105 and bottom end 110. Also shown is easy open feature 120, which in this embodiment is near the bottom end 110 of the front wall 108 of the bag 100c and comprises a full cut 121 in a rectangular shape having a first end 121a and a second end 121b through the front wall 108 of bag 100c, a first row of perforations 122 extending from the first end 121a of the cut 121 across the front wall 108 of bag 100a, a second row of perforations 123 extending from the second end 121b of the cut 121 across the front wall 108 of bag 100c, an optional third row of perforations 124 connecting the end of the first row of perforations 122 and the second row of perforations 123, a cover 125 over the cut 121 and the rows of perforations, and a pull tab 126 attached to the cover 125.

Referring to FIG. 9, a planar view of another embodiment of a substantially flat sheet of material from which a "pinch cut" bag 100d is to be formed is shown. Shown on the sheet are front wall 108, rear wall 106, first side 102 having gusset portion 114a, second side 103 having gusset portion 114b, seam 104, top end 105 and bottom end 110. Also shown is easy open feature 120, which in this embodiment is near the top end 105 of the front wall 108 of the bag 100d and comprises a full cut 121 in a rectangular shape having a first end 121a and a second end 121b through the front wall 108 of bag 100d, a first row of perforations 122 extending from the first end 121a of the cut 121 across the front wall 108 of bag 100d, a second row of perforations 123 extending from the second end 121b of the cut 121 across the front wall 108 of bag 100d, an optional third row of perforations 124 connecting the end of the first row of perforations 122 and the second row of perforations 123, a cover 125 over the cut 121 and the rows of perforations, and a pull tab 126 attached to the cover 125.

Referring to FIG. 10, a planar view of another embodiment of a substantially flat sheet of material from which a "pinch cut" bag 100e is to be formed is shown. Shown on the sheet are front wall 108, rear wall 106, first side 102 having gusset portion 114a, second side 103 having gusset portion 114b, seam 104, top end 105 and bottom end 110. Also shown is easy open feature 120, which in this embodiment is near the top end 105 of the second side 103 of the bag 100e and comprises a full cut 121 in a carat shape having a first end 121a and a second end 121b through the second side 103 of bag 100e, a first row of perforations 122 extending from the first end 121a of the cut 121 across the second side 103 of bag 100e, a second row of perforations 123 extending from the second end 121b of the cut 121 across the second side 103 of bag 100e, an optional third row of perforations 124 connecting the end of the first row of perforations 122 and the second row of perforations 123, and a cover 127 over the cut 121 and a small portion of the first row of perforations 122 and second row of perforations 123.

Referring to FIG. 11, a planar view of another embodiment of a substantially flat sheet of material from which a "pinch cut" bag 100f is to be formed is shown. Shown on the sheet are front wall 108, rear wall 106, first side 102 having gusset portion 114a, second side 103 having gusset portion 114b, seam 104, top end 105 and bottom end 110. Also shown is easy open feature 120, which in this embodiment is near the top end 105 of the second side 103 of the bag 100f and comprises a full cut 121 in a carat shape having a first end 121a and a second end 121b through the second side 103 of bag 100f, a first row of perforations 122 extending from the first end 121a of the cut 121 across the second side 103, front wall 108, first side 102 and rear wall 104 of bag 100f, a second row of perforations 123 extending from the second end 121b of the cut 121 across the second side 103, front wall 108, first side 102 and rear wall 104 of bag 100f, an optional third row of perforations 124 connecting the end of the first row of perforations 122 and the second row of perforations 123, and a cover 127 over the cut 121 and a small portion of the first row of perforations 122 and second row of perforations 123.

Referring to FIG. 12, a planar view of another embodiment of a substantially flat sheet of material from which a "pinch cut" bag 100g is to be formed is shown. Shown on the sheet are front wall 108, rear wall 106, first side 102 having gusset portion 114a, second side 103 having gusset portion 114b, seam 104, top end 105 and bottom end 110. Also shown is easy open feature 120, which in this embodiment is near the top end 105 of the second side 103 of the bag 100g and comprises a full cut 121 in a carat shape having a first end 121a and a second end 121b through the second side 103 of bag 100g, a first row of perforations 122 extending from the first end 121a of the cut 121 across the second side 103, front wall 108 and into the first side 102 of bag 100g, a second row of perforations 123 extending from the second end 121b of the cut 121 across the second side 103, front wall 108 and into the first side 102 of bag 100g, an optional third row of perforations 124 connecting the end of the first row of perforations 122 and the second row of perforations 123, and a cover 127 over the cut 121 and a small portion of the first row of perforations 122 and second row of perforations 123.

Referring to FIG. 13, a planar view of another embodiment of a substantially flat sheet of material from which a "pinch cut" bag 100h is to be formed is shown. Shown on the sheet are front wall 108, rear wall 106, first side 102 having gusset portion 114a, second side 103 having gusset portion 114b, seam 104, top end 105 and bottom end 110. Also shown is easy open feature 120, which in this embodiment is near the top end 105 of the front wall 108 of the bag 100h and comprises a bidirectional full cut 121 in a square shape having a first end 121a, a second end 121b, a third end 121c and a fourth end 121d through the front wall 108 of bag 100h, a first row of perforations 122 extending from the first end 121a of the cut 121 across the front wall 108 and into the first side 102 of bag 100h, a second row of perforations 123 extending from the second end 121b of the cut 121 across the front wall 108 and into the first side 102 of bag 100h, an optional third row of perforations 124 connecting the end of the first row of perforations 122 and the second row of perforations 123, a fourth row of perforations 122a extending from the third end 121c of the cut 121 across the front wall 108 and into the second side 103 of bag 100h, a fifth row of perforations 123a extending from the fourth end 121d of the cut 121 across the front wall 108 and into the second side 103 of bag 100h, an optional sixth row of perforations 124a connecting the end of the fourth row of perforations 122a and the fifth row of perforations 123a, and a cover 127 over the cut 121 and a small portion of the first row of perforations 122, second row of perforations 123, fourth row of perforations 122a and fifth row of perforations 123a.

Referring to FIG. 14, the back side view of yet another embodiment of a "pinch cut" bag 100j is shown. As shown in FIG. 14, the bag 100j has a first end 105 and a second end 110. It is useful to think of first and second ends 105 and 110 as the top and bottom ends of the bag 100j, respectively. The bag 100j has a front wall or surface 108, a rear wall or surface 106, and two side walls 102 and 103. The bag 100j also has a seam 104 on the back side, or rear wall or surface. The seam 104 is made when the bag 100 is formed using conventional methods known to those skilled in the art. Using such conventional methods, a material from which a bag 100j is to be formed (such materials are discussed in detail below) is provided in a substantially flat sheet (see FIG. 8 through FIG. 13). The sheet is then directed and formed so that a portion of one side of the sheet is disposed on top of the other side of the sheet, such as in forming a tube. The overlapping portion is then secured and sealed together, forming the seam 104. Those skilled in the art will appreciate that conventional techniques can be used to provide side gussets in the bag 100j for each of sides 102 and 103 during this forming process.

The bottom (as shown in FIG. 14) of the first end 105 of bag 100j has portions 112a and 112b of the front wall 108 or surface of the bag that extend further from the body of the bag 100j than do portions 114a and 114b of the material of bag 100j forming the side gussets for sides 102 and 103. In addition, the portions 114a and 114b of the side gussets extend further from the body of the bag 100j than the top end 117 of the rear wall 106 of the bag 100j. As shown in FIG. 14, the rear wall of the bag 100j has a top end 117 that does not extend as far from the body of the bag 100j as the end portions 114a and 114b of the side gussets or the end portions 112a and 112b of the front wall 108 of the bag 100j.

Now referring to FIG. 15, a top side view of a "pinch cut" bag 100k is provided. For ease of reference, the same numerals are used in the Figures to denote the same features of bag 100k. As shown in FIG. 15, the bag 100k comprises multiple layers of materials 220, 222 and 224. The first layer 220 is preferably a woven polymeric material, such as polypropylene, polyester, high-density polyethylene, or polyethylene. The woven plastic layer 220 can be made of woven strips of plastic made of film to provide great strength from relatively lightweight materials, and can also be stretched to provide greater strength. For example, cross-laminated, woven plastic film strips, like XF films, are useful and are commercially available from Valeron. Similarly, a biaxially oriented polypropylene plastic material is commercially available from the AmTopp Division of Inteplast Group, Ltd. Those skilled in the art will appreciate that other materials, including various blends of polypropylene and polyethylene can be used without departing from the scope of the invention.

Still referring to FIG. 15, the layer 222 is a coating or a lamination, preferably a polypropylene film. Layer 224 is preferably an oriented polypropylene film with reverse printing. The layer 224 can comprise reverse printing of various labels, advertising, warnings, and other information as may be desired, such as the cover 130 shown in FIG. 15. Although not shown, those skilled in the art will appreciated that the top side, back side, and sides 102 and 103 of the bag 100 may all contain such pictures, patterns, or information as may be desired. Those skilled in the art will appreciate that the reverse printing of layer 224 can be achieved with conventional techniques, and with various conventional plastic films. An advantage of printing the bottom portion of the front and/or back panels is the provision of information that remains visible when the bag is on a display shelf in a store.

Still referring to FIG. 15, the bottom side (as shown in FIG. 15) of the bag 100k extends outward from the body of the bag 100k at the second end 110 of the bag 100k. As shown in FIG. 15, the top side of the bag 100k has an end portion 140 extending along the width of the bag 100k. The side gussets of the sides 102 and 103 of the bag 100k each have portions 142a and 142b which extend further towards the second end 110 of the bag 100k than the end portion 140 of the top side of bag 100k. In addition, the bottom side of the bag 100k has an end portion 110 that extends further from the end portions 142a and 142b of the side gussets. The end portion 110 of the bag 100k includes portions 144a and 144b. As shown in FIG. 15, the second end portion of the bottom side of the bag 100k extends along the entire width of the bag 100k. Also shown is seam 104.

Still referring to FIG. 15, the exposed end portions 144a and 144b of the bottom side of the bag 100k can be coated with a durable adhesive. The adhesive can be applied to selective surface areas, such as portions 144a and 144b, or can be applied in a line extending across the bottom side of the bag 100k along the second end portion 110, including portions 144a and 144b. After the adhesive is applied, preferably the sides 102 and 103 of the bag 100, together with the bottom side of the bag 100k are folded so that at least a portion of the interior surface of the bottom side of the bag 100k extends over the top surface of the top side of the bag 100k. Preferably, the portions 142a and 142b of the side gussets will be folded over and attached to the top surface of the top side of the bag 100k, as well as portions 144a and 144b of the second end 110 of the bottom side of the bag 100k. The coating then seals the second end 110 of the bag 100k together. The first end 105 of the bag 100k can be sealed in a similar fashion if desired. Alternatively, the first end 105 or second end 110 of the bag 100k can be sealed using a hot melt technique or any other technique well-known to those skilled in the art.

Figure 16:
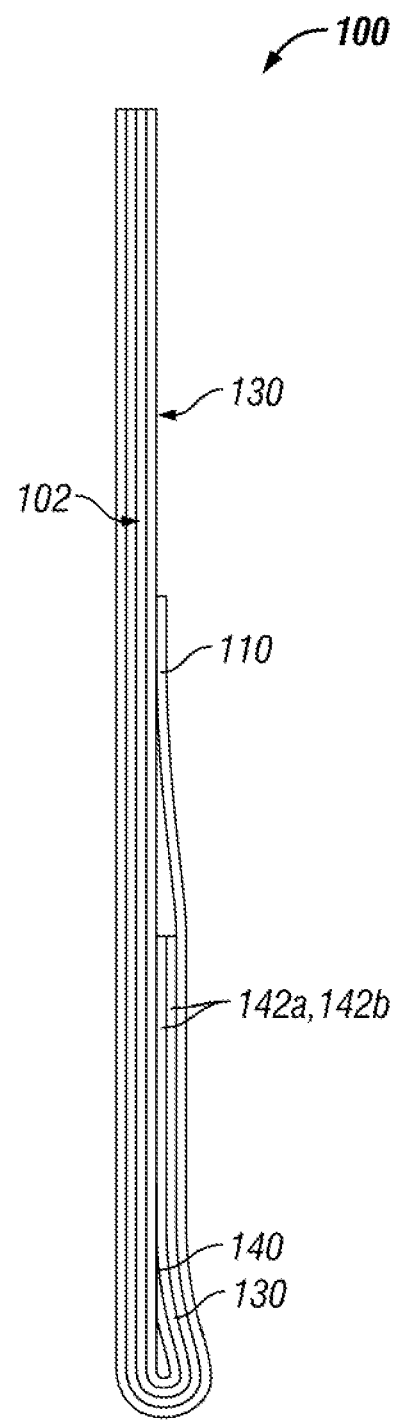
FIG. 16 shows a cross-sectional view of a top end or bottom end portion of a pinch cut bag according to one embodiment of the present disclosure.

Referring now to FIG. 16, a detailed cross-sectional view of an end portion of the bag 100 is provided. As shown in FIG. 16, at least a portion of the front side 130 of bag 100 is now covered by the lowest edge portion 110 of the back side of bag 100, the extending portions 142a, 142b of side 102 of the bag 100, as well as a portion of the front side 130 of bag 100 including end portion 140. Once these portions are folded over, heat and pressure can be applied as appropriate to obtain and ensure that the bottom end 110 of bag 100 is durably sealed, such as with a conventional heat sealable adhesive.

Once the bag 100 is sealed at one end, it can be filled with the desired materials. It has been found that a bag 100 with a height of 41 inches and a width of 28 inches can durably hold at least about fifty (50) pounds of material without showing undue stress, tearing, breakage or the like. It is believed that any bulk material can be contained by bag 100, and the contents can weigh up to 100 pounds or so without undue risk of tearing or damage to bag 100. Once the bag 100 is filled, the second end typically needs to be sealed. The second end of the bag 100 can be sealed in a similar manner as that described above for the bottom end 110. Alternatively, the bag 100 can have its second end sealed by conventional means such as sewing. Still another approach is to seal the second end in a manner like that described for the bottom end 110 of the bag 100, and then stitching one of the two ends (not shown). Although not shown, those skilled in the art will understand and appreciate that a second end of bag 100 can be sealed with conventional techniques once bag 100 has been filled with the selected amount of the desired material.

Figure 17:
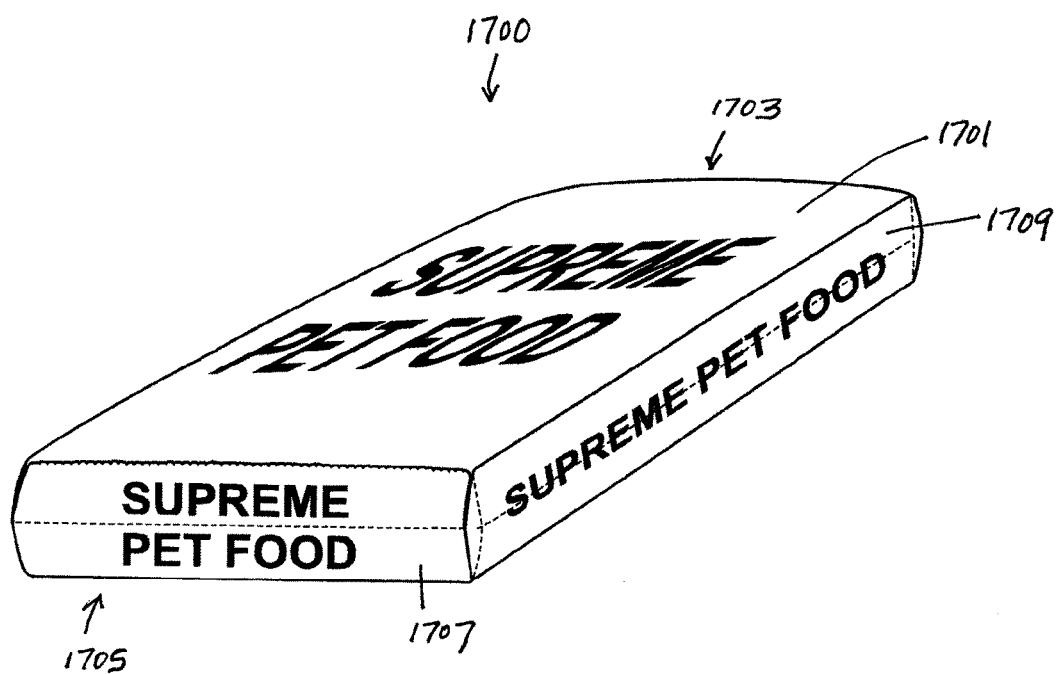
FIG. 17 shows an isometric view of a pinch cut bag according to one embodiment of the present disclosure.

Referring now to FIG. 17, an isometric view of bag 1700 is provided. As shown in FIG. 17, the bag 1700 includes a front panel 1701, a first side panel with gussets 1709, a second side panel with gussets (not visible in FIG. 17), a top end 1703, and a bottom end 1705. The bag 1700 is a pinch cut bag like those described previously, with both a pinch cut top end 1703 and a pinch cut bottom end 1705. The bag 1700 preferably has a weakened area (not shown in FIG. 17) or other easy open feature on at least one surface (not shown in FIG. 17). As shown in FIG. 17, the bag 1700 has been filled and sealed and contains one or more materials. Although the contents of the bag 1700 may be food, animal food, other bulk items, the contents may also contain liquids or mixtures. Those skilled in the art will appreciate that the bag 1700, once formed in accordance with the present disclosure, may be filled and then either the top end 1703 or the bottom end 1705 or both may be sealed as described previously. As shown in FIG. 17, the bag 1700, once filled, presents a bottom panel 1707 on the bottom end 1705 thereof and a top panel on the top end thereof (not visible in FIG. 17). The bag 1700 may be stacked on top of similar or different bags, such as at a grocery store, pet store, or other display location, such that panel 1707 is easily visible to a consumer. As shown in FIG. 17 the front panel 1701, the first side panel 1709 and the bottom panel 1707 includes printing (and can also include graphics), and it will be appreciated by the skilled artisan that the top panel, the rear panel, and the second side panel of bag 1700, which are not visible in FIG. 17, can also include graphics and/or printing. Thus bag 1700 has six discrete areas for printing and/or graphics, each formed by a discrete surface area of the bag 1700. Additionally, the printing and/or graphics can extend across more than one panel, or any combination of the six panels (not shown). The panel 1707 may include graphics and/or printing so that a consumer is able to quickly, readily and easily identify the brand of the contents in the bag, such as the brand name for the pet food therein if the bag 1700 contains pet food. Alternatively, or in addition, the printing or graphics on the panel 1707 may contain information such as price, composition, expiration date, and the like. In another embodiment, the panel 1707 may contain printing or graphics that provide a coupon or other price discount or other offer, either on the contents of the bag 1700 or some other product.

Referring to FIG. 18, the front side view of an embodiment of a "flush cut" bag 1001a is shown. Bag 1001a has a front wall 1010, a back wall 1011, a first side wall 1012, a second side wall 1013, a top end 1014, and a bottom end 1015. It will be apparent, however, that the orientation of the bag ends 14 and 15 is unimportant and the "top" and "bottom" references are useful but may change depending on the orientation one views the bag. Bag 1001a is considered a "flush cut" bag because the front wall 1010 and the back wall 1011 are cut so that the ends of the front wall 1010 and the back wall 1011 are essentially "flush" with one another; they have substantially the same length. Bag 1001a also comprises an easy open feature 1030 comprising a cover 1019 proximal to the sealed single fold 1016 (in other embodiments this could be a double fold) at the bottom end 1015 of the bag 1001a. In this embodiment the cover 1019 comprises a first cut 1031 through the cover 1019 having a first end 1031a and a second end 1031b, a second cut 1032 through the cover 1019 having a first end 1032a and a second end 1032b, and a third cut 1033 through the cover 1019 extending from the first cut 1031 to the second cut 1032. This particular orientation of cuts is also referred to as an "H" cut. Although in this embodiment the "H" cut is located near the center of the cover 1019, the skilled artisan will realize that the "H" cut could be in any location along the cover, for example closer to the first side wall 1012 or the second side wall 1013. The "H" cut can be formed by punching, cutting, or through the use of a laser, or by any other technique known to those skilled in the art. The "H" cut provides a portion of the cover 1019 that is weakened. This weakened portion can be opened with less force than required to open or tear other portions of the cover 1019.

Bag 1001a can be opened by pulling the portion of the cover 1019 on either (or both) end of the third cut 1033, which exposes a weakened area, for example a cut, a series of perforations, or a scoring line, on the front wall 1010 of the bag 1001a proximal to the single 1016 (or double) fold at the bottom end 1015 of the bag 1001a. This weakened portion can be opened with less force than required to open or tear other portions of the bag 1001a, including, but not limited to, the sealed single 1016 (or double) fold. Although not shown in this embodiment, it will be understood that the first cut 1031 and/or second cut 1032 can be larger or smaller, and can extend any distance from the first ends 1031a and 1032a and second ends 1031b and 1032b, respectively, of the first 1031 and second 1032 cut toward the opposite side walls of the bag, for example covering 50%, 75%, 90% or about 100% of the distance from the third cut to the opposite sides of the bag.

Referring to FIG. 19, a front side view of another embodiment of a bag 1001b is shown. Bag 1001b also has a front wall 1010, a back wall 1011, a first side wall 1012, a second side wall 1013, a flush cut top end 1014, and a pinch cut bottom end 1015. Bag 1001b also comprises an easy open feature 1020 comprising a cover 1019, which in this embodiment is near the bottom end 1015 of the bag 1001b and comprises a full cut 1021 in a triangular or carat shape having a first end 1021a and a second end 1021b through the cover 1019. Bag 1001b can be opened by pulling the full cut 1021 across the cover 1019, exposing a weakened area, for example a cut, a series of perforations, or a scoring line, on the front wall 1010 of the bag 1001b. The weakened area of the bag 1001b can be opened with less force than required to open or tear other portions of the bag 1001b.

Figure 20:
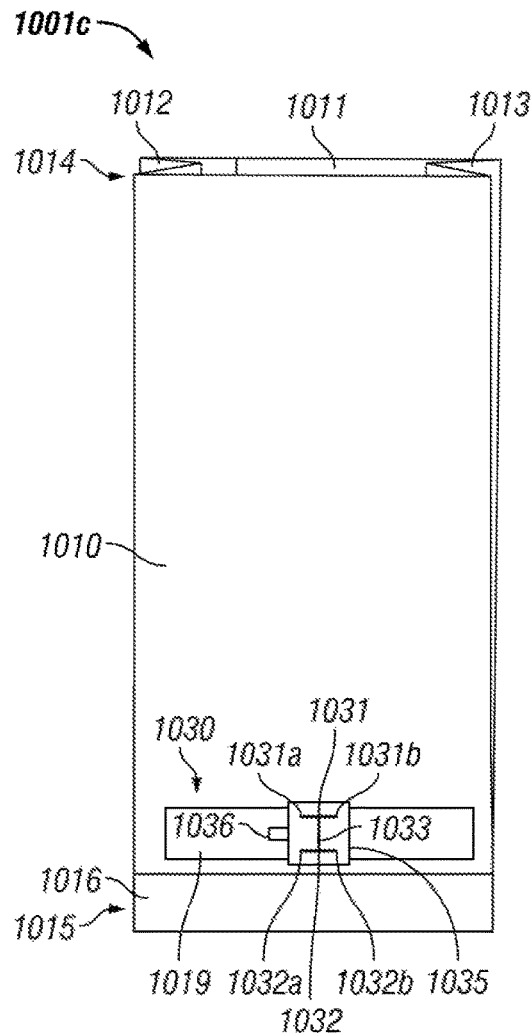
FIG. 20 shows a flush cut bag with an easy open feature comprising a first cover located near the bottom end of the bag with an "H" cut through the first cover and a second cover over the "H" cut in the first cover according to one embodiment of the present disclosure.

Referring to FIG. 20, a front side view of another embodiment of a flush cut bag 1001c is shown. Bag 1001c also has a front wall 1010, a back wall 1011, a first side wall 1012, a second side wall 1013, a top end 1014, and a bottom end 1015. Bag 1001c also comprises an easy open feature 1030 comprising a first cover 1019 that covers a weakened portion of the bag 1001c proximal to the sealed single fold 1016 (in other embodiments this could be a double fold) at the bottom end 1015 of the bag 1001a. In this embodiment the first cover 1019 comprises a first cut 1031 through the first cover 1019 having a first end 1031a and a second end 1031b, a second cut 1032 through the first cover 1019 having a first end 1032a and a second end 1032b, and a third cut 1033 through the first cover 1019 extending from the first cut 1031 to the second cut 1032. Once again, this particular orientation of cuts is also referred to as an "H" cut. In this embodiment the "H" cut is covered by a second cover 1035 having a pull tab 1036. Bag 1001c can be opened by pulling the pull tab 1036, thus removing the second cover 1035 from the "H" cut, and then pulling the portion of the first cover 1019 on either (or both) end of the third cut 1033, which exposes a weakened area, for example a cut, a series of perforations, or a scoring line, on the front wall 1010 of the bag 1001c near the sealed single 1016 (or double) fold at the bottom end 1015 of the bag 1001c. This weakened area can be opened with less force than required to open or tear other portions of the bag 1001c, including, but not limited to, the sealed single 1016 (or double) fold.

Figure 21:
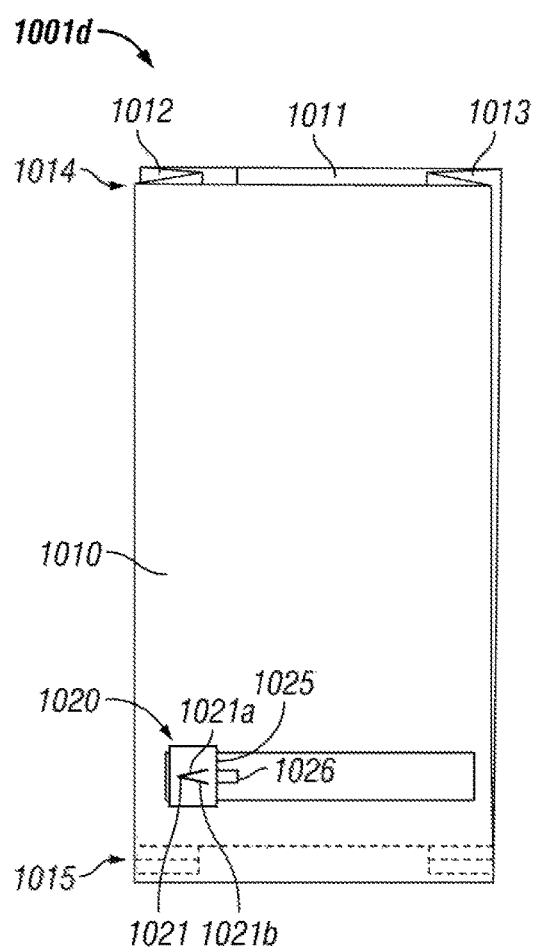
FIG. 21 shows a bag with an easy open feature comprising a first cover located near the bottom end of the bag with a carat cut through the first cover and a second cover over the carat cut through the first cover according to one embodiment of the present disclosure.

Referring to FIG. 21, a front side view of another embodiment of a bag 1001d is shown. Bag 1001d also has a front wall 1010, a back wall 1011, a first side wall 1012, a second side wall 1013, a flush cut top end 1014, and a pinch cut bottom end 1015. Bag 1001d also comprises an easy open feature 1020 comprising a first cover 1019, which in this embodiment is near the bottom end 1015 of the bag 1001d and comprises a full cut 1021 in a triangular or carat shape having a first end 1021a and a second end 1021b through the first cover 1019. In this embodiment the full cut 1021 is covered by a second cover 1025 having a pull tab 1026. Bag 1001d can be opened by pulling the pull tab 1026, thus removing the second cover 1025 from the full cut 1021, and then pulling the full cut 1021 across the first cover 1019, exposing a weakened area, for example a cut, a series of perforations, or a scoring line, on the front wall 1010 of the bag 1001d. The weakened area of the bag 1001d can be opened with less force than required to open or tear other portions of the bag 1001d.

Referring to FIG. 22, the front side view of one embodiment of a "pinch cut" bag 1100a is shown. As shown in FIG. 22, the bag 1100a has a first or top end 1105 and a second or bottom end 1110. Once again, it will be apparent, however, that the orientation of the bag ends 1105 and 1110 is unimportant and the "top" and "bottom" references are useful but may change depending on the orientation one views the bag. In the embodiment shown in FIG. 22 both of the ends of the bag 1100a have a "pinch cut." The bag 1100a has a front wall or surface 1108 with top end 1116, a rear wall or surface 1106, and two side walls 1102 and 1103. Those skilled in the art will appreciate that conventional techniques can be used to provide side gussets in the bag 1100a for each of sides 1102 and 1103 during this forming process. The first end 1105 of bag 1100a has portions 1112a and 1112b of the rear wall or surface 1108 of the bag that extend further from the body of the bag 1100a than do portions 1114a and 1114b of the material of bag 1100a forming the side gussets for sides 1102 and 1103. In addition, the portions 1114a and 1114b of the side gussets extend further from the body of the bag 1100a than the top end 1116 of the front wall 1108 of the bag 1100a. As shown in FIG. 22, the front wall 1108 of the bag 1100a has an end portion 1116 at the first end 1105 of the bag that does not extend as far from the body of the bag 1100a as the end portions 1114a and 1114b of the side gussets or the end portions 1112a and 1112b of the rear wall of the first end 1105 of the bag 1100a. Bag 1100a also comprises an easy open feature 1120 comprising a cover 1019 near the bottom end 1110 of the bag 1100a. In this embodiment the cover 1019 comprises a full cut 1121 in a rectangular shape having a first end 1121a and a second end 1121b through the cover 1019. Bag 1100a can be opened by pulling the full cut 1121 across the cover 1019, exposing a weakened area, for example a cut, a series of perforations, or a scoring line, on the front wall 1108 of the bag 1100a. The weakened area on the front wall 1108 of the bag 1100a can be opened with less force than required to open or tear other portions of the bag 1100a.

Referring to FIG. 23, the front side view of another embodiment of a bag 1100b is shown. As shown in FIG. 23, the bag 1100b has a pinch cut first or top end 1105 and a flush cut second or bottom end 1110. The bag 1100b has a front wall or surface 1108 with top end 1116, a rear wall or surface 1106, and two side walls 1102 and 1103. The first end 1105 of bag 1100b has portions 1112a and 1112b of the rear wall or surface 1108 of the bag that extend further from the body of the bag 1100b than do portions 1114a and 1114b of the material of bag 1100b forming the side gussets for sides 1102 and 1103. In addition, the portions 1114a and 1114b of the side gussets extend further from the body of the bag 1100b than the top end 1116 of the front wall 1108 of the bag 1100b. As shown in FIG. 23, the front wall 1108 of the bag 1100b has an end portion 1116 at the first end 1105 of the bag that does not extend as far from the body of the bag 1100b as the end portions 1114a and 1114b of the side gussets or the end portions 1112a and 1112b of the rear wall of the first end 1105 of the bag 1100b. In addition, the bottom end 1110 of bag 1100b is sealed using a single fold 1109 (in other embodiments this can be a double fold). Bag 1100b also comprises an easy open feature 1130 comprising a cover 1019, proximal to the sealed single 1016 (or double) fold at the bottom end 1110 of the bag 1100b. The cover 1019 comprises a first cut 1031 through the cover 1019 having a first end 1031a and a second end 1031b, a second cut 1032 through the cover 1019 having a first end 1032a and a second end 1032b, and a third cut 1033 through the cover 1019 extending from the first cut 1031 to the second cut 1032. Once again, this particular orientation of cuts is also referred to as an "H" cut. Bag 1100b can be opened by pulling the portion of the cover 1019 on either (or both) end of the third cut 1033, which exposes a weakened area, for example a cut, a series of perforations, or a scoring line, on the front wall 1108 of the bag 1100b. The weakened area on the front wall 1108 of the bag 1100b can be opened with less force than required to open or tear other portions of the bag 1100b, including, but not limited to, the sealed single 1109 (or double) fold.

Referring to FIG. 24, the front side view of one embodiment of a "pinch cut" bag 1100c is shown. As shown in FIG. 24, the bag 1100c has a first or top end 1105 and a second or bottom end 1110. Once again, it will be apparent, however, that the orientation of the bag ends 1105 and 1110 is unimportant and the "top" and "bottom" references are useful but may change depending on the orientation one views the bag. In the embodiment shown in FIG. 24 both of the ends of the bag 1100c have a "pinch cut." The bag 1100c has a front wall or surface 1108 with top end 1116, a rear wall or surface 1106, and two side walls 1102 and 1103. Those skilled in the art will appreciate that conventional techniques can be used to provide side gussets in the bag 1100c for each of sides 1102 and 1103 during this forming process. The first end 1105 of bag 1100c has portions 1112a and 1112b of the rear wall or surface 1108 of the bag that extend further from the body of the bag 1100c than do portions 1114a and 1114b of the material of bag 1100c forming the side gussets for sides 1102 and 1103. In addition, the portions 1114a and 1114b of the side gussets extend further from the body of the bag 1100c than the top end 1116 of the front wall 1108 of the bag 1100c. As shown in FIG. 24, the front wall 1108 of the bag 1100c has an end portion 1116 at the first end 1105 of the bag that does not extend as far from the body of the bag 1100c as the end portions 1114a and 1114b of the side gussets or the end portions 1112a and 1112b of the rear wall of the first end 1105 of the bag 1100c. Bag 1100c also comprises an easy open feature 1120 comprising a first cover 1019 near the bottom end 1110 of the bag 1100c. In this embodiment the first cover 1019 comprises a full cut 1121 in a rectangular shape having a first end 1121a and a second end 1121b through the first cover 1019, and a second cover 1125 having a pull tab 1126 covering the full cut 1121 in the first cover 1019. Bag 1100c can be opened by pulling the pull tab 1126, thus removing the second cover 1125 from the full cut 1121, and then pulling the full cut 1121 across the first cover 1019, exposing a weakened area, for example a cut, a series of perforations, or a scoring line, on the front wall 1108 of the bag 1100c. The weakened area on the front wall 1108 of the bag 1100c can be opened with less force than required to open or tear other portions of the bag 1100c.

Referring to FIG. 25, the front side view of another embodiment of a bag 1100d is shown. As shown in FIG. 25, the bag 1100d has a pinch cut first or top end 1105 and a flush cut second or bottom end 1110. The bag 1100d has a front wall or surface 1108 with top end 1116, a rear wall or surface 1106, and two side walls 1102 and 1103. The first end 1105 of bag 1100d has portions 1112a and 1112b of the rear wall or surface 1108 of the bag that extend further from the body of the bag 1100d than do portions 1114a and 1114b of the material of bag 1100d forming the side gussets for sides 1102 and 1103. In addition, the portions 1114a and 1114b of the side gussets extend further from the body of the bag 1100d than the top end 1116 of the front wall 1108 of the bag 1100d. As shown in FIG. 25, the front wall 1108 of the bag 1100d has an end portion 1116 at the first end 1105 of the bag that does not extend as far from the body of the bag 1100d as the end portions 1114a and 1114b of the side gussets or the end portions 1112a and 1112b of the rear wall of the first end 1105 of the bag 1100d. In addition, the bottom end 1110 of bag 1100d is sealed using a single fold 1109 (in other embodiments this can be a double fold). Bag 1100d also comprises an easy open feature 1130 comprising a first cover 1019, which in this embodiment is proximal to the sealed single 1016 (or double) fold at the bottom end 1110 of the bag 1100b. The first cover 1019 comprises a first cut 1031 through the first cover 1019 having a first end 1031a and a second end 1031b, a second cut 1032 through the first cover 1019 having a first end 1032a and a second end 1032b, and a third cut 1033 through the first cover 1019 extending from the first cut 1031 to the second cut 1032. Once again, this particular orientation of cuts is also referred to as an "H" cut. Bag 1100d also has a second cover 1135 having a pull tab 1136 that covers the "H" cut. Bag 1100d can be opened by pulling the pull tab 1136 thus removing the second cover 1135 from the "H" cut, and pulling the portion of the first cover 1019 on either (or both) end of the third cut 1033, which exposes weakened area, for example a cut, a series of perforations, or a scoring line, on the front wall 1108 of the bag 1100c. The weakened area on the front wall 1108 of the bag 1100c can be opened with less force than required to open or tear other portions of the bag 1100c, including, but not limited to, the sealed single 1109 (or double) fold.

Figure 26:
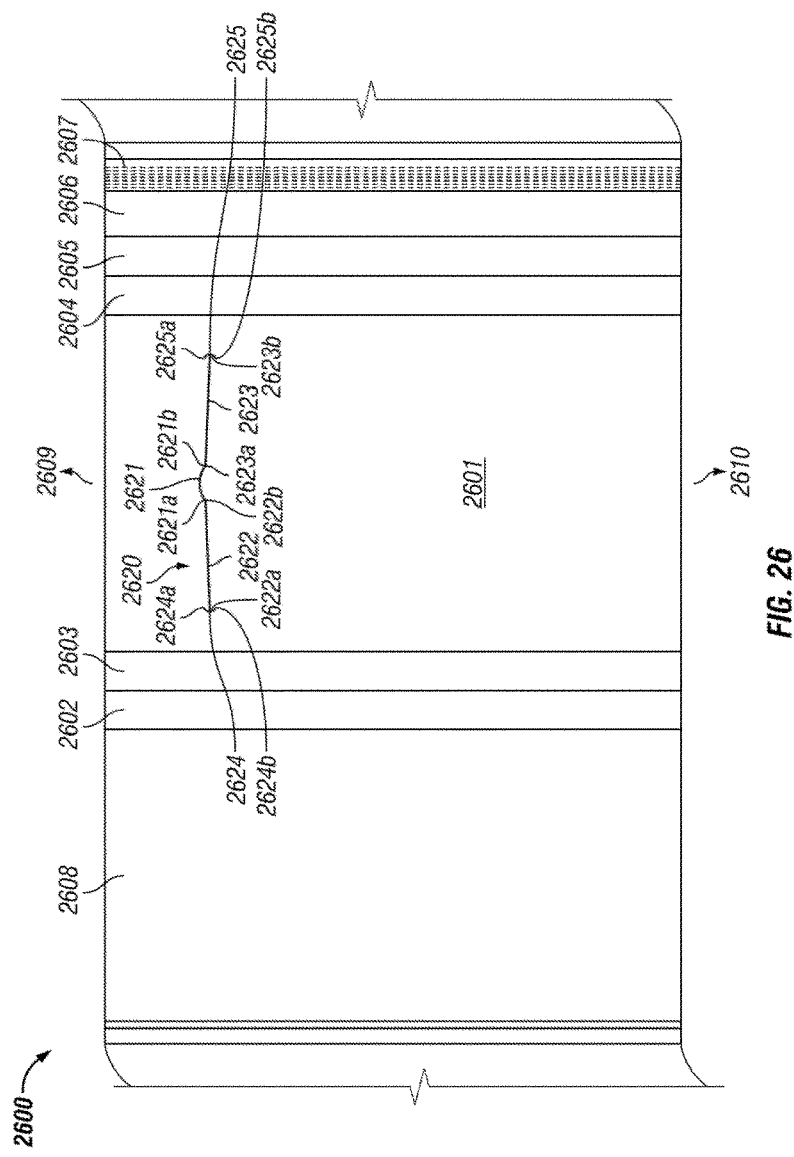
FIG. 26 shows a bag with an easy open feature located near the top end of the bag comprising a central curved portion, a first side portion attached to the first end of the central curved portion and a second side portion attached to the second end of the central curved portion, the first and second side portions defining an obtuse angle and extending away from the top end of the bag, and a first curved end portion attached to the first end of the first side portion and a second curved end portion attached to the second end of the second side portion.

Referring to FIG. 26, a portion of a planar view of an embodiment of a substantially flat sheet of material from which a bag 2600 is to be formed is shown. Bag 2600 can be either a "flush cut" or "pinch cut" bag, as described herein above, but these details are not shown in FIG. 26 for ease of depiction. Bag 2600 has a front wall 2601, a first side wall having a first side 2602 and a second side 2603, a second side wall having a first side 2604 and a second side 2605, a back wall having a first portion 2606 with seam 2607 and a second portion 2608, a top end 2609 (not shown in FIG. 26), and a bottom end 2610 (not shown in FIG. 26). It will be apparent, however, that the orientation of the bag ends 2609 and 2610 is unimportant and the "top" and "bottom" references are useful but may change depending on the orientation one views the bag. Bag 2600 also comprises an easy open feature 2620 proximal to the top end 2609 of the bag 2600. In this embodiment the easy open feature 2620 comprises a central curved cut portion 2621 in the front wall 2601 having a first end 2621a and a second end 2621b, a first side cut portion 2622 in the front wall 2601 defining a line extending away from the top end 2609 of the bag 2600 attached to the first end 2621a of the central curved cut portion 2621, the first side cut portion 2622 having a first end 2622a and a second end 2622b, a second side cut portion 2623 in the front wall 2601 defining a line extending at an angle away from the top end 2609 of the bag 2600 attached to the second end 2621b of the central curved cut portion 2621, the second side cut portion 2623 having a first end 2623a and a second end 2623b, a curved first end cut portion 2624 in the front wall 2601 attached to the first end 2622a of the first side cut portion 2622, the curved first end cut portion 2624 having a first end 2624a and a second end 2624b, and a curved second end cut portion 2625 in the front wall 2601 attached to the second end 2623b of the second side cut portion 2623, the curved second end cut portion 2625 having a first end 2625a and a second end 2625b.

The first side cut portion 2622 and the second side cut portion 2623 define an obtuse angle. Although in this embodiment the easy open feature 2620 is located near the center of the front wall 2601, approximately midway between the second side 2603 of the first side wall and the first side 2604 of the second side wall, the skilled artisan will realize that the easy open feature 2620 could be in any location along the front wall 2601, for example closer to the second side 2603 of the first side wall or the first side 2604 of the second side wall. In addition, although in the embodiment shown in FIG. 26 the first side cut portion 2622 and the second side cut portion 2623 define essentially straight lines, in other embodiments (not shown) these features can define curved lines, or a combination of curved and straight lines. The lines need not be straight or even substantially straight, although that is generally preferred in certain embodiments. The central curved cut portion 2621, the first side cut portion 2622, the second side cut portion 2623, the curved first end cut portion 2624 and curved second end cut portion 2625 can be formed by punching, cutting, or through the use of a laser, or by any other technique known to those skilled in the art. The central curved cut portion 2621, the first side cut portion 2622, the second side cut portion 2623, the curved first end cut portion 2624 and curved second end cut portion 2625 provide portions of the front wall 2601 that are weakened. These weakened portions can be opened with less force than required to open or tear other portions of the front wall 2601 of the bag 2600. Additionally, the curved first end cut portion 2624 and curved second end cut portion 2625 serve to retard the propagation of the opening of the bag at the first end 2622a of the first side cut portion 2622 and at the second end 2623b of the second side cut portion 2623, respectively.

Those skilled in the art will appreciate that, when a force is applied to the bag 2600 to open it, the force applied will tear the first and second layers in the location of the weakened portion before other portions of the bag wall tear. In addition, the shape, size, and type of weakening of the bag wall that defines the weakened portion can be used to direct the tearing of the bag when a force is applied, since the tear, once started, will propagate along the weakened portion of the bag wall. Moreover, the first end portion 2624 and the second end portion 2625 serve to stop the propagation of the tearing from continuing in the bag wall past the weakened portion. When the bag is opened and a force applied, the tearing of the bag will follow the shape of the weakened portion until the tear reaches the first end portion and the second end portion. Once the tear reaches the first end portion, the tear will follow the shape of the first end portion upwards and downwards from the end of the first side portion. Similarly, once the tear reaches the second end portion, the tear will follow the shape of the second end portion upwards and downwards from the second side portion. Moreover, by providing an end portion that extends both upwards and downwards from the end of each side portion, the force applied to tear the bag wall is divided, thus making further tearing in the bag wall past or outside the weakened portion (e.g., the extension of the tear along a hypothetical continuation of the side portion less likely. Thus, the first and second end portions serve to control the extent and direction of the tearing of the bag wall when a force is applied, such as to open the bag.

It can be appreciated that a bag like those disclosed herein that allows for relatively easy tearing along a controlled and defined line or in a controlled and defined area, such as the weakened portion of the bag, is advantageous because such a bag allows for easy opening without the need for tools or scissors, yet also prevents the tear, once started, from extending across the entire bag wall or even further, or resulting in an uncontrolled and undirected tear. In addition, such a bag like those disclosed herein prevents and minimizes the potential for fraying of the woven polymer strips and/or the film layer. When a conventional woven bag is torn, such as by hand, the tear often results in fraying of the woven strips and other portions of the bag, resulting in a jagged, uneven, and/or poorly defined tear, which may extend in several directions from where it started, and may extend further than desired, such as a tear that results in spillage of the contents of the bag. Such fraying can result in small strands, fibers, or strips of the bag material coming loose and falling through the tear and into the bag, thereby mixing with and contaminating the contents of the bag. Thus, it is an advantage of the bag disclosed herein that the shape, size, and configuration of the weakened portion is able to and is used to control the extent and direction of the tearing of the bag wall when a force is applied, such as to open the bag, and also prevent and minimize the potential for fraying of the woven polymer and film layers of the bag and contamination of the contents of the bag.

Figure 27:
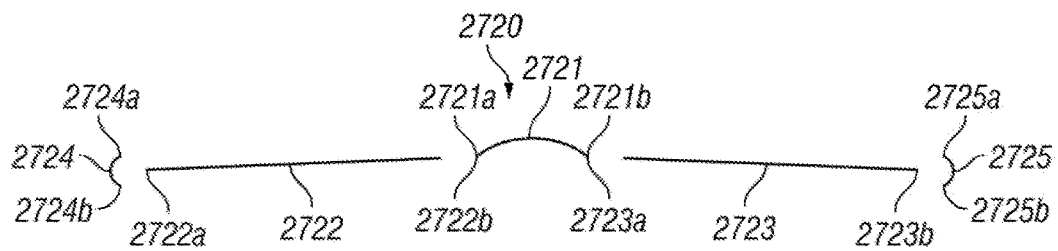
FIG. 27 shows an alternative easy open feature comprising a central curved portion, a first side portion proximal to the first end of the central curved portion and a second side portion proximal to the second end of the central curved portion, the first and second side portions defining an obtuse angle, and a first curved end portion proximal to the first end of the first side portion and a second curved end portion proximal to the second end of the second side portion.

Referring to FIG. 27, an alternative easy open feature 2720 is shown. In this embodiment the easy open feature 2720 comprises a central curved cut portion 2721 having a first end 2721a and a second end 2721b, a first side cut portion 2722 defining a line proximal the first end 2721a of the central curved cut portion 2721, the first side cut portion 2722 having a first end 2722a and a second end 2722b, a second side cut portion 2723 defining a line proximal the second end 2721b of the central curved cut portion 2721, the second side cut portion 2723 having a first end 2723a and a second end 2723b, a curved first end cut portion 2724 proximal the first end 2722a of the first side cut portion 2722, the curved first end cut portion 2724 having a first end 2724a and a second end 2724b, and a curved second end cut portion 2725 proximal the second end 2723b of the second side cut portion 2723, the curved second end cut portion 2725 having a first end 2725a and a second end 2725b. The first side cut portion 2722 and the second side cut portion 2723 define an obtuse angle. Although in the embodiment shown in FIG. 27 the first side cut portion 2722 and the second side cut portion 2723 define essentially straight lines, in other embodiments (not shown) these features can define curved lines, or a combination of curved and straight lines. The central curved cut portion 2721, the first side cut portion 2722, the second side cut portion 2723, the curved first end cut portion 2724 and curved second end cut portion 2725 can be formed by punching, cutting, or through the use of a laser, or by any other technique known to those skilled in the art.

Figure 28:
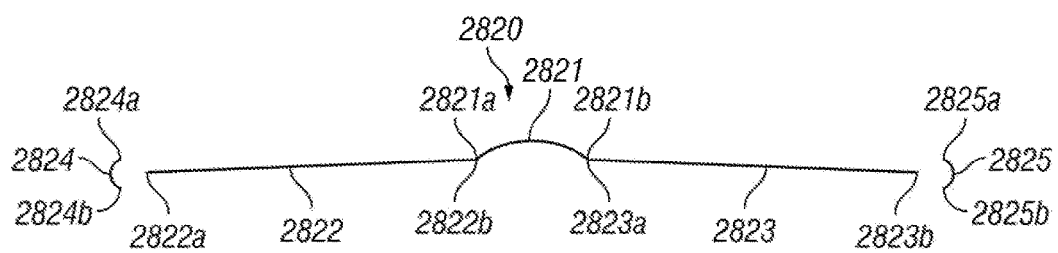
FIG. 28 shows another alternative easy open feature comprising a central curved portion, a first side portion attached to the first end of the central curved portion and a second side portion attached to the second end of the central curved portion, the first and second side portions defining an obtuse angle, and a first curved end portion proximal to the first end of the first side portion and a second curved end portion proximal to the second end of the second side portion.

Referring to FIG. 28, another alternative easy open feature 2820 is shown. In this embodiment the easy open feature 2820 comprises a central curved cut portion 2821 having a first end 2821a and a second end 2821b, a first side cut portion 2822 defining a line attached to the first end 2821a of the central curved cut portion 2821, the first side cut portion 2822 having a first end 2822a and a second end 2822b, a second side cut portion 2823 defining a line attached to the second end 2821b of the central curved cut portion 2821, the second side cut portion 2823 having a first end 2823a and a second end 2823b, a curved first end cut portion 2824 proximal the first end 2822a of the first side cut portion 2822, the curved first end cut portion 2824 having a first end 2824a and a second end 2824b, and a curved second end cut portion 2825 proximal the second end 2823b of the second side cut portion 2823, the curved second end cut portion 2825 having a first end 2825a and a second end 2825b. The first side cut portion 2822 and the second side cut portion 2823 define an obtuse angle. Although in the embodiment shown in FIG. 28 the first side cut portion 2822 and the second side cut portion 2823 define essentially straight lines, in other embodiments (not shown) these features can define curved lines, or a combination of curved and straight lines. The central curved cut portion 2821, the first side cut portion 2822, the second side cut portion 2823, the curved first end cut portion 2824 and curved second end cut portion 2825 can be formed by punching, cutting, or through the use of a laser, or by any other technique known to those skilled in the art.

Figure 29:
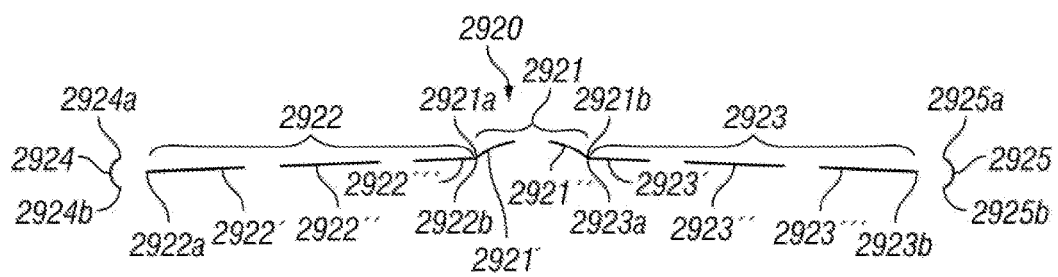
FIG. 29 shows another alternative easy open feature located comprising a central curved portion, a first side portion proximal to the first end of the central curved portion and a second side portion proximal to the second end of the central curved portion, the first and second side portions defining an obtuse angle, and a first curved end portion proximal to the first end of the first side portion and a second curved end portion proximal to the second end of the second side portion.

Referring to FIG. 29, another alternative easy open feature 2920 is shown. In this embodiment the easy open feature 2920 comprises a central curved portion 2921 having a first end 2921a and a second end 2921b and comprising plurality of cuts 2921' and 2921", a first side portion 2922 having a first end 2922a and a second end 2922b and comprising plurality of cuts 2922', 2922" and 2922''' defining a line proximal the first end 2921a of the central curved portion 2921, a second side portion 2923 having a first end 2923a and a second end 2923b and comprising plurality of cuts 2923', 2923" and 2923''' defining a line proximal the second end 2921b of the central curved portion 2921, a curved first end cut portion 2924 proximal the first end 2922a of the first side portion 2922, the curved first end cut portion 2924 having a first end 2924a and a second end 2924b, and a curved second end cut portion 2925 proximal the second end 2923b of the second side portion 2923, the curved second end cut portion 2925 having a first end 2925a and a second end 2925b. The first side portion 2922 and the second side portion 2923 define an obtuse angle. Although in the embodiment shown in FIG. 29 the first side portion 2922 and the second side portion 2923 define a plurality of essentially straight lines, in other embodiments (not shown) these features can define curved lines, or a combination of curved and straight lines. The central curved portion 2921, the first side portion 2922, the second side portion 2923, the curved first end cut portion 2924 and curved second end cut portion 2925 can be formed by punching, cutting, or through the use of a laser, or by any other technique known to those skilled in the art.

Figure 30:
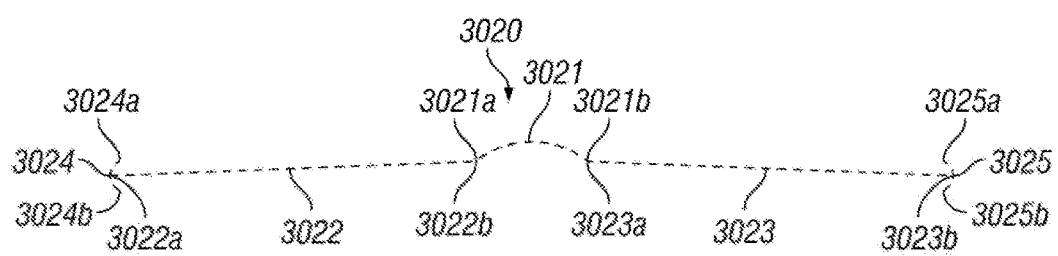
FIG. 30 another alternative easy open feature comprising a central curved portion, a first side portion proximal to the first end of the central curved portion and a second side portion proximal to the second end of the central curved portion, the first and second side portions defining an obtuse angle, and a first curved end portion proximal to the first end of the first side portion and a second curved end portion proximal to the second end of the second side portion.

Referring to FIG. 30, another alternative easy open feature 3020 is shown. In this embodiment the easy open feature 3020 comprises a central curved portion 3021 comprising a plurality of perforations having a first end 3021a and a second end 3021b, a first side portion 3022 comprising a plurality of perforations defining a line proximal the first end 3021a of the central curved portion 3021, the first side portion 3022 having a first end 3022a and a second end 3022b, a second side portion 3023 comprising a plurality of perforations defining a line proximal the second end 3021b of the central curved portion 3021, the second side portion 3023 having a first end 3023a and a second end 3023b, a curved first end portion 3024 comprising a plurality of perforations proximal the first end 3022a of the first side portion 3022, the curved first end portion 3024 having a first end 3024a and a second end 3024b, and a curved second end portion 3025 comprising a plurality of perforations proximal the second end 3023b of the second side portion 3023, the curved second end portion 3025 having a first end 3025a and a second end 3025b. The first side portion 3022 and the second side portion 3023 define an obtuse angle. Although in the embodiment shown in FIG. 30 the first side portion 3022 and the second side portion 3023 define essentially straight lines, in other embodiments (not shown) these features can define curved lines, or a combination of curved and straight lines. The central curved portion 3021, the first side portion 3022, the second side portion 3023, the curved first end portion 3024 and curved second end portion 3025 can be formed by punching, or through the use of a laser, or by any other technique known to those skilled in the art.

Figure 31:
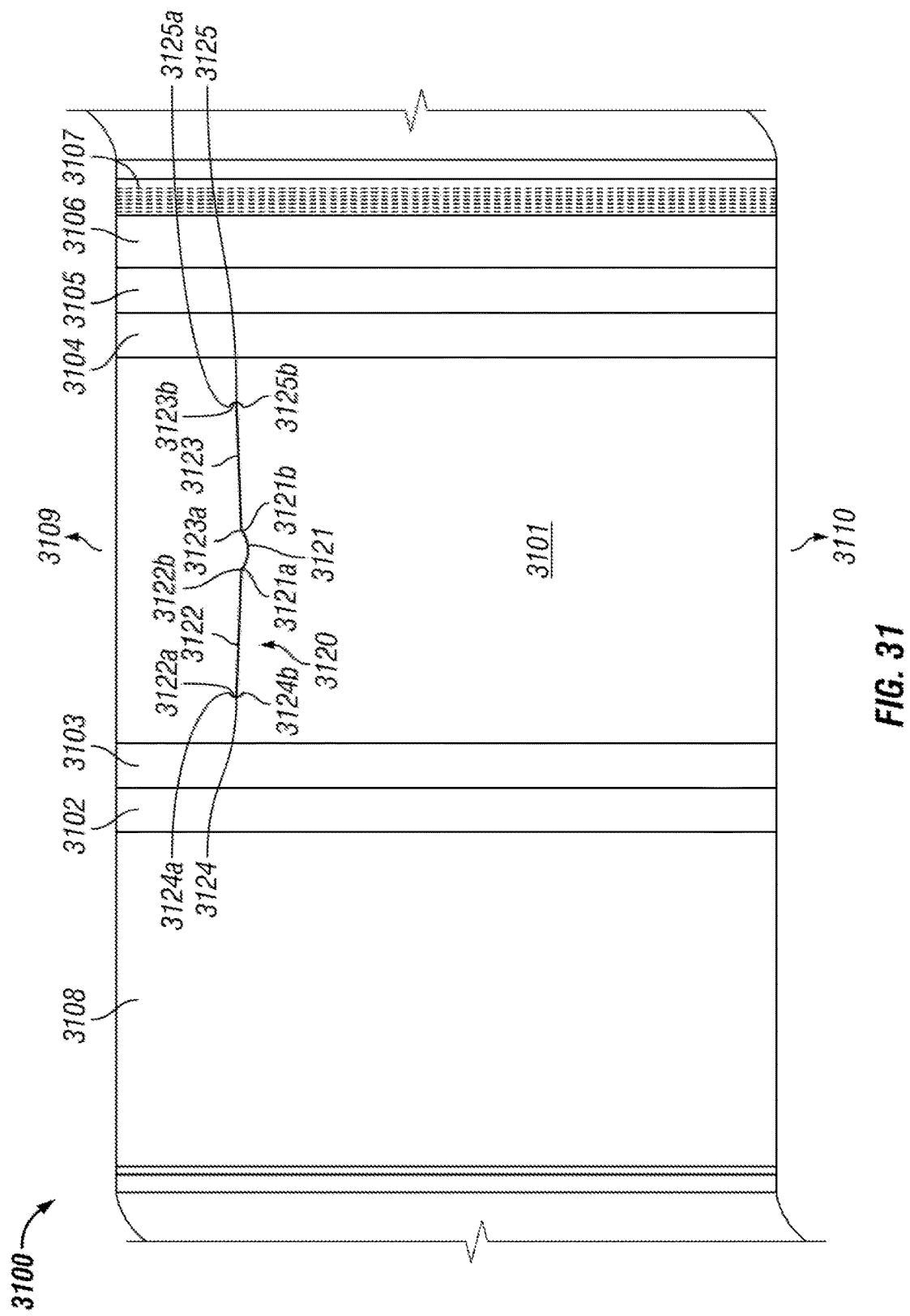
FIG. 31 shows a bag with an easy open feature located near the top end of the bag comprising a central curved portion, a first side portion attached to the first end of the central curved portion and a second side portion attached to the second end of the central curved portion, the first and second side portions defining an obtuse angle extending toward the top end of the bag, and a first curved end portion attached to the first end of the first side portion and a second curved end portion attached to the second end of the second side portion.

Referring to FIG. 31, a portion of a planar view of an embodiment of a substantially flat sheet of material from which a bag 3100 is to be formed is shown. Bag 3100 can be either a "flush cut" or "pinch cut" bag, as described herein above, but these details are not shown in FIG. 31 for ease of depiction. Bag 3100 has a front wall 3101, a first side wall having a first side 3102 and a second side 3103, a second side wall having a first side 3104 and a second side 3105, a back wall having a first portion 3106 with seam 3107 and a second portion 3108, a top end 3109 (not shown in FIG. 31), and a bottom end 3110 (not shown in FIG. 31). It will be apparent, however, that the orientation of the bag ends 3109 and 3110 is unimportant and the "top" and "bottom" references are useful but may change depending on the orientation one views the bag. Bag 3100 also comprises an easy open feature 3120 proximal to the top end 3109 of the bag 3100. In this embodiment the easy open feature 3120 comprises a central curved cut portion 3121 in the front wall 3101 having a first end 3121a and a second end 3121b, a first side cut portion 3122 in the front wall 3101 defining a line extending toward the top end 3109 of the bag 3100 attached to the first end 3121a of the central curved cut portion 3121, the first side cut portion 3122 having a first end 3122a and a second end 3122b, a second side cut portion 3123 in the front wall 3101 defining a line extending at an angle toward the top end 3109 of the bag 3100 attached to the second end 3121b of the central curved cut portion 3121, the second side cut portion 3123 having a first end 3123a and a second end 3123b, a curved first end cut portion 3124 in the front wall 3101 attached to the first end 3122a of the first side cut portion 3122, the curved first end cut portion 3124 having a first end 3124a and a second end 3124b, and a curved second end cut portion 3125 in the front wall 3101 attached to the second end 3123b of the second side cut portion 3123, the curved second end cut portion 3125 having a first end 3125a and a second end 3125b. The first side cut portion 3122 and the second side cut portion 3123 define an obtuse angle. Although in this embodiment the easy open feature 3120 is located near the center of the front wall 3101, approximately midway between the second side 3103 of the first side wall and the first side 3104 of the second side wall, the skilled artisan will realize that the easy open feature 3120 could be in any location along the front wall 3101, for example closer to the second side 3103 of the first side wall or the first side 3104 of the second side wall. In addition, although in the embodiment shown in FIG. 31 the first side cut portion 3122 and the second side cut portion 3123 define essentially straight lines, in other embodiments (not shown) these features can define curved lines, or a combination of curved and straight lines. The central curved cut portion 3121, the first side cut portion 3122, the second side cut portion 3123, the curved first end cut portion 3124 and curved second end cut portion 3125 can be formed by punching, cutting, or through the use of a laser, or by any other technique known to those skilled in the art. The central curved cut portion 3121, the first side cut portion 3122, the second side cut portion 3123, the curved first end cut portion 3124 and curved second end cut portion 3125 provide portions of the front wall 3101 that are weakened. These weakened portions can be opened with less force than required to open or tear other portions of the front wall 3101 of the bag 3100. Additionally, the curved first end cut portion 3124 and curved second end cut portion 3125 serve to retard the propagation of the opening of the bag at the first end 3122a of the first side cut portion 3122 and at the second end 3123b of the second side cut portion 3123, respectively.

Figure 32:
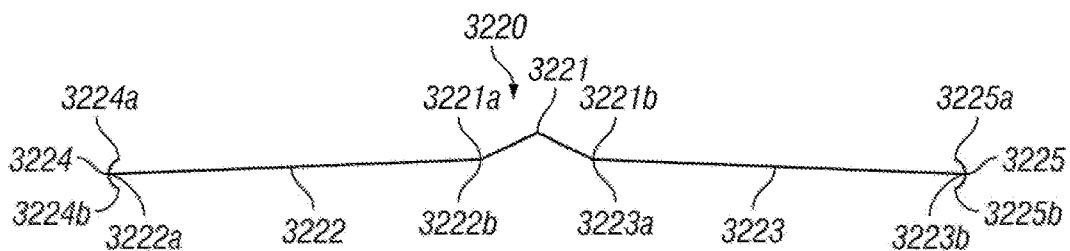
FIG. 32 shows an alternative easy open feature comprising a central carat portion, a first side portion attached to the first end of the central carat portion and a second side portion attached to the second end of the central carat portion, the first and second side portions defining an obtuse angle, and a first curved end portion attached to the first end of the first side portion and a second curved end portion attached to the second end of the second side portion.

Referring to FIG. 32, another alternative easy open feature 3220 is shown. In this embodiment the easy open feature 3220 comprises a central carat-shaped cut portion 3221 having a first end 3221a and a second end 3221b, a first side cut portion 3222 defining a line attached to the first end 3221a of the central carat-shaped cut portion 3221, the first side cut portion 3222 having a first end 3222a and a second end 3222b, a second side cut portion 3223 defining a line attached to the second end 3221b of the central carat-shaped cut portion 3221, the second side cut portion 3223 having a first end 3223a and a second end 3223b, a curved first end cut portion 3224 attached to the first end 3222a of the first side cut portion 3222, the curved first end cut portion 3224 having a first end 3224a and a second end 3224b, and a curved second end cut portion 3225 attached to the second end 3223b of the second side cut portion 3223, the curved second end cut portion 3225 having a first end 3225a and a second end 3225b. The first side cut portion 3222 and the second side cut portion 3223 define an obtuse angle. Although in the embodiment shown in FIG. 32 the first side cut portion 3222 and the second side cut portion 3223 define essentially straight lines, in other embodiments (not shown) these features can define curved lines, or a combination of curved and straight lines. The central carat-shaped cut portion 3221, the first side cut portion 3222, the second side cut portion 3223, the curved first end cut portion 3224 and curved second end cut portion 3225 can be formed by punching, cutting, or through the use of a laser, or by any other technique known to those skilled in the art.

Figure 33:
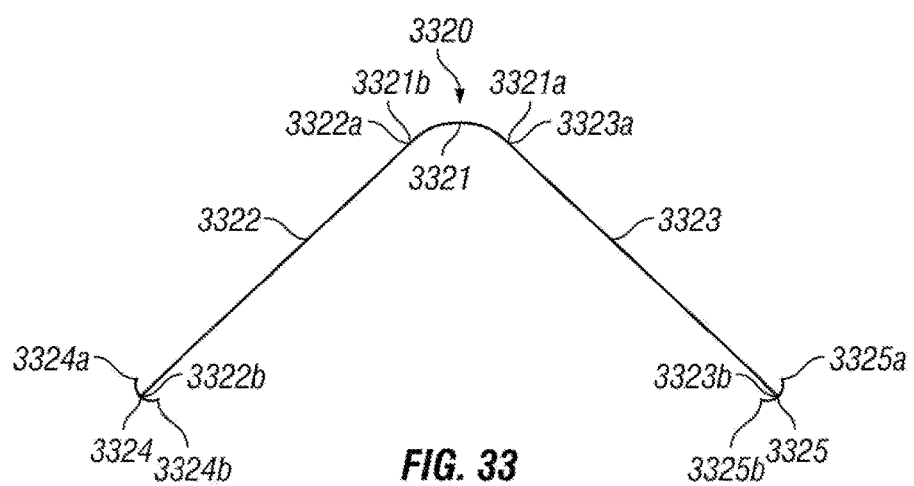
FIG. 33 shows another alternative easy open feature comprising a central curved portion, a first side portion attached to the first end of the central curved portion and a second side portion attached to the second end of the central curved portion, the first and second side portions defining a right angle, and a first curved end portion attached to the first end of the first side portion and a second curved end portion attached to the second end of the second side portion.

Referring to FIG. 33, another alternative easy open feature 3320 is shown. In this embodiment the easy open feature 3320 comprises a central curved cut portion 3321 having a first end 3321a and a second end 3321b, a first side cut portion 3322 defining a line attached to the first end 3321a of the central curved cut portion 3321, the first side cut portion 3322 having a first end 3322a and a second end 3322b, a second side cut portion 3323 defining a line attached to the second end 3321b of the central curved cut portion 3321, the second side cut portion 3323 having a first end 3323a and a second end 3323b, a curved first end cut portion 3324 attached to the first end 3322a of the first side cut portion 3322, the curved first end cut portion 3324 having a first end 3324a and a second end 3324b, and a curved second end cut portion 3325 attached to the second end 3323b of the second side cut portion 3323, the curved second end cut portion 3325 having a first end 3325a and a second end 3325b. The first side cut portion 3322 and the second side cut portion 3323 define a right angle. Although in the embodiment shown in FIG. 33 the first side cut portion 3322 and the second side cut portion 3323 define essentially straight lines, in other embodiments (not shown) these features can define curved lines, or a combination of curved and straight lines. The central curved cut portion 3321, the first side cut portion 3322, the second side cut portion 3323, the curved first end cut portion 3324 and curved second end cut portion 3325 can be formed by punching, cutting, or through the use of a laser, or by any other technique known to those skilled in the art.

Figure 34:
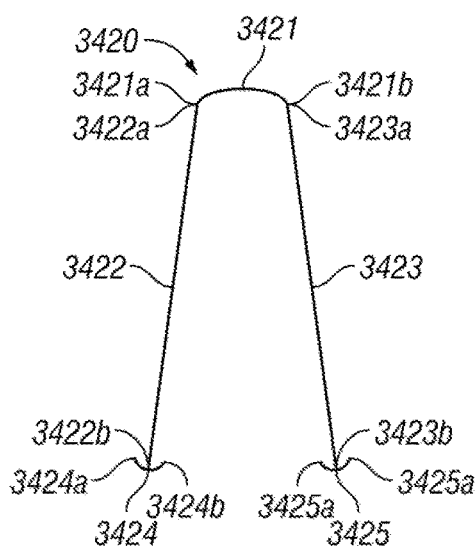
FIG. 34 shows another alternative easy open feature comprising a central curved portion, a first side portion attached to the first end of the central curved portion and a second side portion attached to the second end of the central curved portion, the first and second side portions defining an acute angle, and a first curved end portion attached to the first end of the first side portion and a second curved end portion attached to the second end of the second side portion.

Referring to FIG. 34, another alternative easy open feature 3420 is shown. In this embodiment the easy open feature 3420 comprises a central curved cut portion 3421 having a first end 3421a and a second end 3421b, a first side cut portion 3422 defining a line attached to the first end 3421a of the central curved cut portion 3421, the first side cut portion 3422 having a first end 3422a and a second end 3422b, a second side cut portion 3423 defining a line attached to the second end 3421b of the central curved cut portion 3421, the second side cut portion 3423 having a first end 3423a and a second end 3423b, a curved first end cut portion 3424 attached to the first end 3422a of the first side cut portion 3422, the curved first end cut portion 3424 having a first end 3424a and a second end 3424b, and a curved second end cut portion 3425 attached to the second end 3423b of the second side cut portion 3423, the curved second end cut portion 3425 having a first end 3425a and a second end 3425b. The first side cut portion 3422 and the second side cut portion 3423 define an acute angle. Although in the embodiment shown in FIG. 34 the first side cut portion 3422 and the second side cut portion 3423 define essentially straight lines, in other embodiments (not shown) these features can define curved lines, or a combination of curved and straight lines. The central curved cut portion 3421, the first side cut portion 3422, the second side cut portion 3423, the curved first end cut portion 3424 and curved second end cut portion 3425 can be formed by punching, cutting, or through the use of a laser, or by any other technique known to those skilled in the art.

Figure 35:
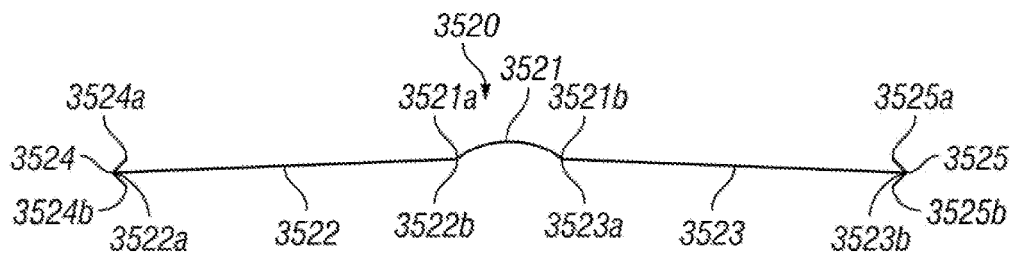
FIG. 35 shows another alternative easy open feature comprising a central curved portion, a first side portion attached to the first end of the central curved portion and a second side portion attached to the second end of the central curved portion, the first and second side portions defining an obtuse angle, and a first carat-shaped end portion attached to the first end of the first side portion and a second carat-shaped end portion attached to the second end of the second side portion.

Referring to FIG. 35, another alternative easy open feature 3520 is shown. In this embodiment the easy open feature 3520 comprises a central curved cut portion 3521 having a first end 3521a and a second end 3521b, a first side cut portion 3522 defining a line attached to the first end 3521a of the central curved cut portion 3521, the first side cut portion 3522 having a first end 3522a and a second end 3522b, a second side cut portion 3523 defining a line attached to the second end 3521b of the central curved cut portion 3521, the second side cut portion 3523 having a first end 3523a and a second end 3523b, a carat-shaped first end cut portion 3524 attached to the first end 3522a of the first side cut portion 3522, the carat-shaped first end cut portion 3524 having a first end 3524a and a second end 3524b, and a carat-shaped second end cut portion 3525 attached to the second end 3523b of the second side cut portion 3523, the carat-shaped second end cut portion 3525 having a first end 3525a and a second end 3525b. The first side cut portion 3522 and the second side cut portion 3523 define an obtuse angle. Although in the embodiment shown in FIG. 35 the first side cut portion 3522 and the second side cut portion 3523 define essentially straight lines, in other embodiments (not shown) these features can define curved lines, or a combination of curved and straight lines. The central curved cut portion 3521, the first side cut portion 3522, the second side cut portion 3523, the carat-shaped first end cut portion 3524 and carat-shaped second end cut portion 3525 can be formed by punching, cutting, or through the use of a laser, or by any other technique known to those skilled in the art.

Figure 36:
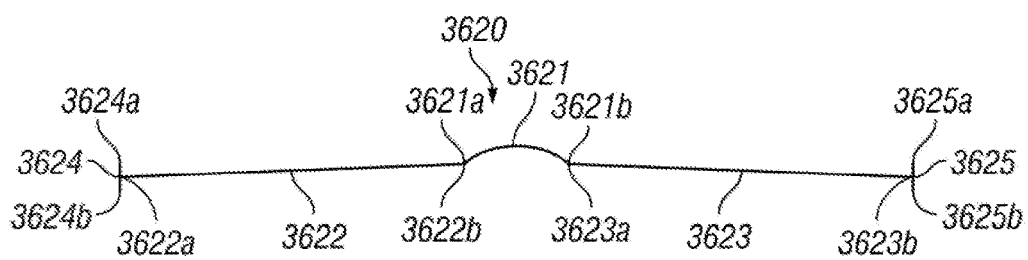
FIG. 36 shows another alternative easy open feature comprising a central curved portion, a first side portion attached to the first end of the central curved portion and a second side portion attached to the second end of the central curved portion, the first and second side portions defining an obtuse angle, and a first end portion defining a line attached to the first end of the first side portion and a second end portion defining a line attached to the second end of the second side portion.

Referring to FIG. 36, another alternative easy open feature 3620 is shown. In this embodiment the easy open feature 3620 comprises a central curved cut portion 3621 having a first end 3621a and a second end 3621b, a first side cut portion 3622 defining a line attached to the first end 3621a of the central curved cut portion 3621, the first side cut portion 3622 having a first end 3622a and a second end 3622b, a second side cut portion 3623 defining a line attached to the second end 3621b of the central curved cut portion 3621, the second side cut portion 3623 having a first end 3623a and a second end 3623b, a first end cut portion 3624 defining a line attached to the first end 3622a of the first side cut portion 3622, the first end cut portion 3624 having a first end 3624a and a second end 3624b, and a second end cut portion 3625 defining a line attached to the second end 3623b of the second side cut portion 3623, the second end cut portion 3625 having a first end 3625a and a second end 3625b. Although in FIG. 36 the lines defined by the first end cut portion and second end cut portion are perpendicular with respect to the first and second side cut portions, respectively, in other embodiments (not shown) the lines defined by the first end cut portion and second end cut portion can be at any angle with respect to the first and second side cut portions, respectively. In addition, although the lines defined by the first and second end portions are attached at essentially the middle to the first and second side cut portions, respectively, in other embodiments (not shown) the lines defined by the first and second end portions can attached at any portion along their length to the first and second side cut portions, respectively. The first side cut portion 3622 and the second side cut portion 3623 define an obtuse angle. Although in the embodiment shown in FIG. 36 the first side cut portion 3622 and the second side cut portion 3623 define essentially straight lines, in other embodiments (not shown) these features can define curved lines, or a combination of curved and straight lines. The central curved cut portion 3621, the first side cut portion 3622, the second side cut portion 3623, the first end cut portion 3624 and second end cut portion 3625 can be formed by punching, cutting, or through the use of a laser, or by any other technique known to those skilled in the art.

Figure 37:
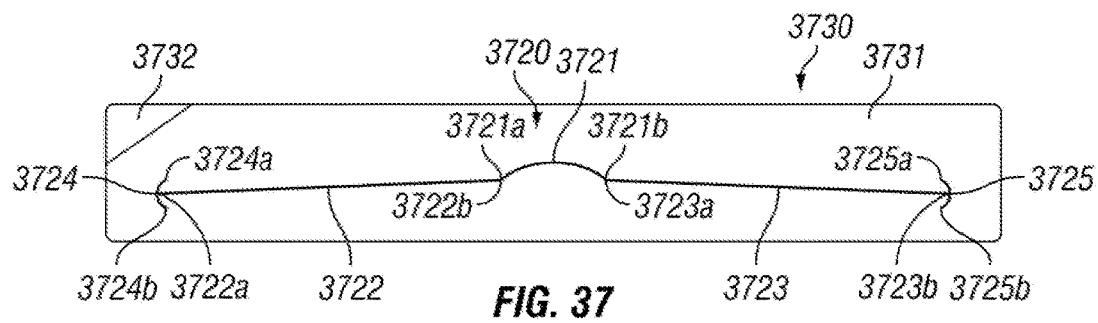
FIG. 37 shows an alternative easy open feature with a cover, the easy open feature comprising a central curved portion, a first side portion attached to the first end of the central curved portion and a second side portion attached to the second end of the central curved portion, the first and second side portions defining an obtuse angle, and a first curved end portion attached to the first end of the first side portion and a second curved end portion attached to the second end of the second side portion. The cover comprises a first portion and a second portion comprising a pull tab in the top left corner of the cover as shown.

Referring to FIG. 37, an alternative easy open feature 3720 with a cover 3730 is shown. In this embodiment the easy open feature 3720 comprises a central curved cut portion 3721 having a first end 3721a and a second end 3721b, a first side cut portion 3722 defining a line attached to the first end 3721a of the central curved cut portion 3721, the first side cut portion 3722 having a first end 3722a and a second end 3722b, a second side cut portion 3723 defining a line attached to the second end 3721b of the central curved cut portion 3721, the second side cut portion 3723 having a first end 3723a and a second end 3723b, a curved first end cut portion 3724 attached to the first end 3722a of the first side cut portion 3722, the curved first end cut portion 3724 having a first end 3724a and a second end 3724b, and a curved second end cut portion 3725 attached to the second end 3723b of the second side cut portion 3723, the curved second end cut portion 3725 having a first end 3725a and a second end 3725b. The first side cut portion 3722 and the second side cut portion 3723 define an obtuse angle. Cover 3730 comprises a first portion 3731 and a second portion 3732 that comprises a pull tab. In this embodiment the second portion 3732 that comprises a pull tab is located in the upper-left hand corner of the cover 3730. In certain embodiments the first portion 3731 of the cover 3730 comprises an adhesive. Although in the embodiment shown in FIG. 37 the first side cut portion 3722 and the second side cut portion 3723 define essentially straight lines, in other embodiments (not shown) these features can define curved lines, or a combination of curved and straight lines. The central curved cut portion 3721, the first side cut portion 3722, the second side cut portion 3723, the curved first end cut portion 3724 and curved second end cut portion 3725 can be formed by punching, cutting, or through the use of a laser, or by any other technique known to those skilled in the art. When incorporated into a bag as disclosed herein (not shown in FIG. 37), the cover 3730 is adapted so that no portion of the bag is removed when the cover 3730 is pulled open. In certain embodiments after removing some of the contents from the bag the cover 3730 can be replaced over the easy open feature 3720 to reclose the bag.

Figure 38:
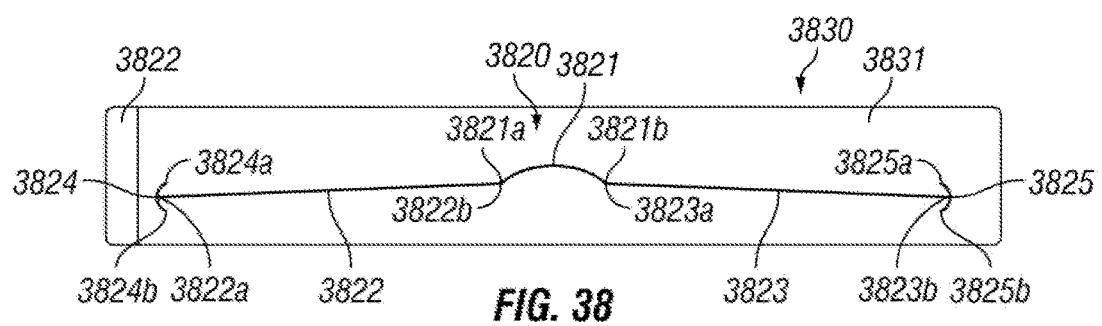
FIG. 38 shows an alternative easy open feature with a cover, the easy open feature comprising a central curved portion, a first side portion attached to the first end of the central curved portion and a second side portion attached to the second end of the central curved portion, the first and second side portions defining an obtuse angle, and a first curved end portion attached to the first end of the first side portion and a second curved end portion attached to the second end of the second side portion. The cover comprises a first portion and a second portion comprising a pull tab on the left side of the cover as shown.

Referring to FIG. 38, an alternative easy open feature 3820 and an alternative cover 3830 is shown. In this embodiment the easy open feature 3820 comprises a central curved cut portion 3821 having a first end 3821a and a second end 3821b, a first side cut portion 3822 defining a line attached to the first end 3821a of the central curved cut portion 3821, the first side cut portion 3822 having a first end 3822a and a second end 3822b, a second side cut portion 3823 defining a line attached to the second end 3821b of the central curved cut portion 3821, the second side cut portion 3823 having a first end 3823a and a second end 3823b, a curved first end cut portion 3824 attached to the first end 3822a of the first side cut portion 3822, the curved first end cut portion 3824 having a first end 3824a and a second end 3824b, and a curved second end cut portion 3825 attached to the second end 3823b of the second side cut portion 3823, the curved second end cut portion 3825 having a first end 3825a and a second end 3825b. The first side cut portion 3822 and the second side cut portion 3823 define an obtuse angle. Cover 3830 comprises a first portion 3831 and a second portion 3832 that comprises a pull tab. In this embodiment the second portion 3832 that comprises a pull tab defines a rectangle at the left hand side of the cover 3830. In certain embodiments the first portion 3831 of the cover 3830 comprises an adhesive. Although in the embodiment shown in FIG. 38 the first side cut portion 3822 and the second side cut portion 3823 define essentially straight lines, in other embodiments (not shown) these features can define curved lines, or a combination of curved and straight lines. The central curved cut portion 3821, the first side cut portion 3822, the second side cut portion 3823, the curved first end cut portion 3824 and curved second end cut portion 3825 can be formed by punching, cutting, or through the use of a laser, or by any other technique known to those skilled in the art. When incorporated into a bag as disclosed herein (not shown in FIG. 38), the cover 3830 is adapted so that no portion of the bag is removed when the cover 3830 is pulled open. In certain embodiments after removing some of the contents from the bag the cover 3830 can be replaced over the easy open feature 3820 to reclose the bag.

Figure 39:
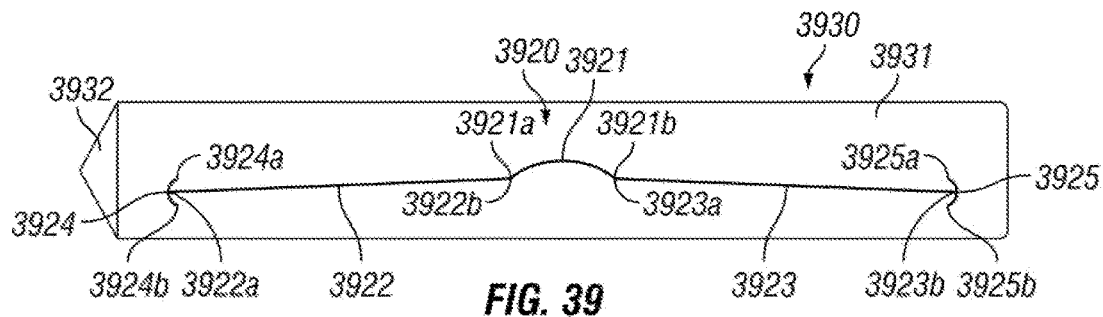
FIG. 39 shows an alternative easy open feature with a cover, the easy open feature comprising a central curved portion, a first side portion attached to the first end of the central curved portion and a second side portion attached to the second end of the central curved portion, the first and second side portions defining an obtuse angle, and a first curved end portion attached to the first end of the first side portion and a second curved end portion attached to the second end of the second side portion. The cover comprises a first portion and a second portion comprising a pull tab defining a carat on the left side of the cover as shown.

Referring to FIG. 39, an alternative easy open feature 3920 and another alternative cover 3930 is shown. In this embodiment the easy open feature 3920 comprises a central curved cut portion 3921 having a first end 3921a and a second end 3921b, a first side cut portion 3922 defining a line attached to the first end 3921a of the central curved cut portion 3921, the first side cut portion 3922 having a first end 3922a and a second end 3922b, a second side cut portion 3923 defining a line attached to the second end 3921b of the central curved cut portion 3921, the second side cut portion 3923 having a first end 3923a and a second end 3923b, a curved first end cut portion 3924 attached to the first end 3922a of the first side cut portion 3922, the curved first end cut portion 3924 having a first end 3924a and a second end 3924b, and a curved second end cut portion 3925 attached to the second end 3923b of the second side cut portion 3923, the curved second end cut portion 3925 having a first end 3925a and a second end 3925b. The first side cut portion 3922 and the second side cut portion 3923 define an obtuse angle. Cover 3930 comprises a first portion 3931 and a second portion 3932 that comprises a pull tab. In this embodiment the second portion 3932 that comprises a pull tab defines a triangle or carat at the left hand side of the cover 3930. In certain embodiments the first portion 3931 of the cover 3930 comprises an adhesive. Although in the embodiment shown in FIG. 39 the first side cut portion 3922 and the second side cut portion 3923 define essentially straight lines, in other embodiments (not shown) these features can define curved lines, or a combination of curved and straight lines. The central curved cut portion 3921, the first side cut portion 3922, the second side cut portion 3923, the curved first end cut portion 3924 and curved second end cut portion 3925 can be formed by punching, cutting, or through the use of a laser, or by any other technique known to those skilled in the art. When incorporated into a bag as disclosed herein (not shown in FIG. 39), the cover 3930 is adapted so that no portion of the bag is removed when the cover 3930 is pulled open. In certain embodiments after removing some of the contents from the bag the cover 3930 can be replaced over the easy open feature 3920 to reclose the bag.

Figure 40:
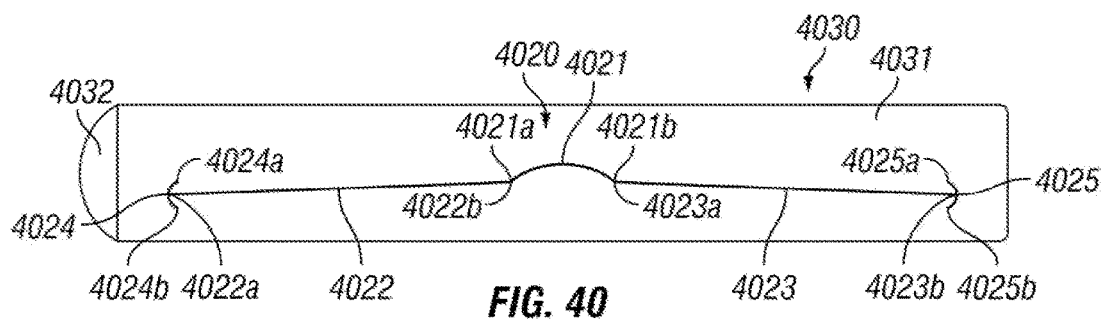
FIG. 40 shows an alternative easy open feature with a cover, the easy open feature comprising a central curved portion, a first side portion attached to the first end of the central curved portion and a second side portion attached to the second end of the central curved portion, the first and second side portions defining an obtuse angle, and a first curved end portion attached to the first end of the first side portion and a second curved end portion attached to the second end of the second side portion. The cover comprises a first portion and a second portion comprising a pull tab defining a curve on the left side of the cover as shown.

Referring to FIG. 40, another alternative easy open feature 4020 with another alternative cover 4030 is shown. In this embodiment the easy open feature 4020 comprises a central curved cut portion 4021 having a first end 4021a and a second end 4021b, a first side cut portion 4022 defining a line attached to the first end 4021a of the central curved cut portion 4021, the first side cut portion 4022 having a first end 4022a and a second end 4022b, a second side cut portion 4023 defining a line attached to the second end 4021b of the central curved cut portion 4021, the second side cut portion 4023 having a first end 4023a and a second end 4023b, a curved first end cut portion 4024 attached to the first end 4022a of the first side cut portion 4022, the curved first end cut portion 4024 having a first end 4024a and a second end 4024b, and a curved second end cut portion 4025 attached to the second end 4023b of the second side cut portion 4023, the curved second end cut portion 4025 having a first end 4025a and a second end 4025b. The first side cut portion 4022 and the second side cut portion 4023 define an obtuse angle. Cover 4030 comprises a first portion 4031 and a second portion 4032 that comprises a pull tab. In this embodiment the second portion 4032 that comprises a pull tab defines a curved portion at the left hand side of the cover 4030. In certain embodiments the first portion 4031 of the cover 4030 comprises an adhesive. Although in the embodiment shown in FIG. 40 the first side cut portion 4022 and the second side cut portion 4023 define essentially straight lines, in other embodiments (not shown) these features can define curved lines, or a combination of curved and straight lines. The central curved cut portion 4021, the first side cut portion 4022, the second side cut portion 4023, the curved first end cut portion 4024 and curved second end cut portion 4025 can be formed by punching, cutting, or through the use of a laser, or by any other technique known to those skilled in the art. When incorporated into a bag as disclosed herein (not shown in FIG. 40), the cover 4030 is adapted so that no portion of the bag is removed when the cover 4030 is pulled open. In certain embodiments after removing some of the contents from the bag the cover 4030 can be replaced over the easy open feature 4020 to reclose the bag.

Figure 41:
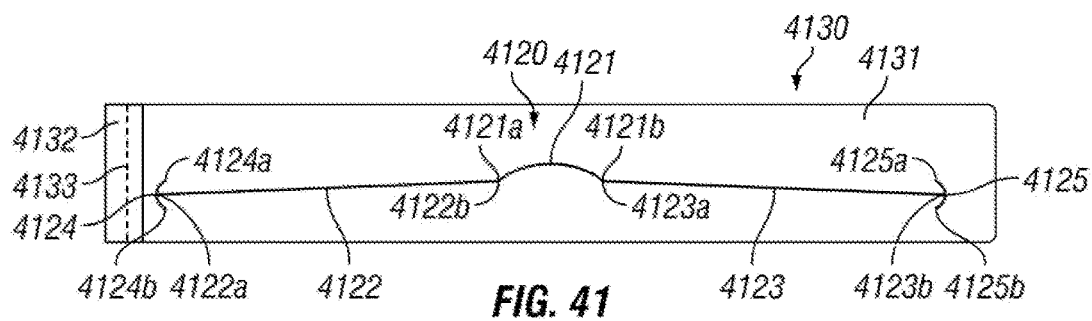
FIG. 41 shows an alternative easy open feature with a cover, the easy open feature comprising a central curved portion, a first side portion attached to the first end of the central curved portion and a second side portion attached to the second end of the central curved portion, the first and second side portions defining an obtuse angle, and a first curved end portion attached to the first end of the first side portion and a second curved end portion attached to the second end of the second side portion. The cover comprises a first portion and a second portion comprising a pull tab with a fold line on the left side of the cover as shown.

Referring to FIG. 41, another alternative easy open feature 4120 with another alternative cover 4130 is shown. In this embodiment the easy open feature 4120 comprises a central curved cut portion 4121 having a first end 4121a and a second end 4121b, a first side cut portion 4122 defining a line attached to the first end 4121a of the central curved cut portion 4121, the first side cut portion 4122 having a first end 4122a and a second end 4122b, a second side cut portion 4123 defining a line attached to the second end 4121b of the central curved cut portion 4121, the second side cut portion 4123 having a first end 4123a and a second end 4123b, a curved first end cut portion 4124 attached to the first end 4122a of the first side cut portion 4122, the curved first end cut portion 4124 having a first end 4124a and a second end 4124b, and a curved second end cut portion 4125 attached to the second end 4123b of the second side cut portion 4123, the curved second end cut portion 4125 having a first end 4125a and a second end 4125b. The first side cut portion 4122 and the second side cut portion 4123 define an obtuse angle. Cover 4130 comprises a first portion 4131 and a second portion 4132 that comprises a pull tab. In this embodiment the second portion 4132 that comprises a pull tab defines a rectangle with a fold line 4133 at the left hand side of the cover 4130. In certain embodiments the first portion 4131 of the cover 4130 comprises an adhesive. Although in the embodiment shown in FIG. 41 the first side cut portion 4122 and the second side cut portion 4123 define essentially straight lines, in other embodiments (not shown) these features can define curved lines, or a combination of curved and straight lines. The central curved cut portion 4121, the first side cut portion 4122, the second side cut portion 4123, the curved first end cut portion 4124 and curved second end cut portion 4125 can be formed by punching, cutting, or through the use of a laser, or by any other technique known to those skilled in the art. When incorporated into a bag as disclosed herein (not shown in FIG. 41), the cover 4130 is adapted so that no portion of the bag is removed when the cover 4130 is pulled open. In certain embodiments after removing some of the contents from the bag the cover 4130 can be replaced over the easy open feature 4120 to reclose the bag.

Those skilled in the art will understand and appreciate that the bag according to the invention may vary in size, dimensions, and shape without departing from the scope of the invention, and that the foregoing description of the preferred embodiments is not intended to limit the scope of the invention as defined by the claims. For example, those skilled in the art will understand and appreciate that the foregoing bags can have sealed and sewn ends in a tubular bag with side gussets as shown, or a block bottom and top, or a combination thereof, although not shown. Those skilled in the art will also appreciate that a weakened portion or area can be provided in a number of ways that may vary from those expressly described and shown, such as by stressing portions of the bag wall with or without deforming, perforating, or cutting same, as well as varying the size, number, depth, and/or pattern of perforations, cuts, and/or deformations in a bag wall. It will also be appreciated that the weakened portion can comprise a plurality of portions of differing strength. For example, the bag may have one or more cuts with one or more perforations, with the cuts and perforations differing in size, shape, and/or length, and/or differing in the spacing between them, so that, for example, a tear may start easily by application of a force at a particular location of the weakened portion, and yet extend or propagate with more difficulty in a second portion of the weakened portion in which the cuts and/or perforations are shorter or have more spacing between them than such cuts and/or perforations, for example, thus requiring application of a greater force to the second portion of the weakened portion to propagate the tear than in the first portion of the weakened portion. In addition, the depth of the cuts and/or perforations may vary. For example, the cuts and/or perforations may extend entirely through the bag wall and all layers of the bag, or may extend through one or more layers of the bag wall, but only partially into another one or more layers, or may extend entirely or partially through one or more layers in a bag wall in one portion of the weakened portion, and yet extend a greater or lesser depth through one or more layers or the entire bag wall in another, second portion of the weakened portion. This can be done to impart greater or lesser strength to a plurality of portions of the weakened portion to help control the extent and direction of tearing of the bag wall when a force is applied, such as to open the bag. Similarly, those skilled in the art will understand that the bags disclosed herein may be provided with a re-usable opening or a corner portion adapted to allow a person to easily pour the contents of the disclosed bags, or a combination of these two features. Such features are conventional with prior art bags. Similarly, those skilled in the art will appreciate that terms such as "front" and "rear," and "top" and "bottom," are useful in describing a bag, but essentially depend on a bag's orientation when such terms are used, and are therefore not limiting as to a bag's orientation.

I claim:

1. A bag comprising a front wall, a back wall, a first end adapted to form a first end panel when the first end is closed, a second end adapted to form a second end panel when the second end is closed, each of the front wall and the back wall having an interior surface, an exterior surface, a first side, a second side, a first end and a second end, wherein each of the front wall and the back wall comprise a laminate consisting essentially of a first layer, a second layer, and a third layer, wherein the first layer comprises woven oriented polymer strips, the second layer comprises an oriented polymer film, and the third layer comprises an oriented polymer film, and wherein the bag further comprises (a) at least one central cut on the front wall of the bag, the central cut defining a curve having a concave portion with respect to the first end of the bag and comprising a first end and a second end, (b) a first side portion cut comprising a first end and a second end, with the second end of the first side portion cut located proximal to the first end of the central cut, (c) a second side portion cut comprising a first end located proximal to the second end of the central cut and a second end, (d) a first end portion cut located proximal to the first end of the first side portion cut, and (e) a second end portion cut located proximal to the second end of the second side portion cut, wherein each of the central cut, first side portion cut, second side portion cut, first end portion cut, and second end portion cut extend through the first layer, the second layer, and the third layer of the laminate of the front wall of the bag, wherein the first side portion cut defines a line extending away from the first end of the central cut and towards the first end of the bag, wherein the second side portion cut defines a line extending away from the second end of the central cut and towards the first end of the bag, wherein the first end portion cut extends above and below the first end of the first side portion cut and the second end portion cut extends above and below the second end of the second side portion cut, wherein each of the first end portion cut and the second end portion cut define a curve having a concave portion with respect to the center axis of the bag, wherein each of the first end portion cut and the second end portion cut retards the propagation of tearing of the front bag wall when the first side portion or the second side portion, respectively, is torn, and wherein said bag further comprises a cover having a pull tab, wherein the cover is located on the exterior of the front wall of said bag and covers at least the central cut, the first side portion cut, the second side portion cut, the first end portion cut, and the second end portion cut.

2. The bag according to claim 1, wherein the central cut further comprises a plurality of cuts.

3. The bag according to claim 1, further comprising a plurality of perforations.

4. The bag according to claim 1, wherein the central cut further defines a carat.

5. The bag according to claim 4, wherein the carat opens toward the second end of the bag.

6. The bag according to claim 1, wherein the first side portion cut and the second side portion cut each define a line extending downward with respect to the first end of the bag.

7. The bag according to claim 1, wherein the first side portion cut and the second side portion cut each define a line extending upward with respect to the first end of the bag.

8. The bag according to claim 1, wherein an acute angle is defined by the first side portion cut and the second side portion cut.

9. The bag according to claim 1, wherein a right angle is defined by the first side portion cut and the second side portion cut.

10. The bag according to claim 1, wherein an obtuse angle is defined by the first side portion cut and the second side portion cut.

11. The bag according to claim 1, wherein the first end portion cut or the second end portion cut defines a carat.

12. The bag according to claim 11, wherein the first end portion cut and the second end portion cut define a carat.

13. The bag according to claim 1, wherein the pull tab is located in a corner proximal the top end and the first side of the cover.

14. The bag according to claim 1, wherein the pull tab is located along at least a portion of the first side of the cover.

15. The bag according to claim 1, wherein the pull tab defines a curve.

16. The bag according to claim 1, wherein the pull tab defines a rectangle.

17. The bag according to claim 1, wherein the pull tab defines a carat.

18. The bag according to claim 1, wherein the pull tab defines a triangle.

19. The bag according to claim 1, wherein the first portion of the cover comprises an adhesive.

20. The bag according to claim 19, wherein the first portion of the cover and the second portion of the cover comprise an adhesive.

21. The bag according to claim 20, wherein the first portion of the cover comprises an increased tensile pull-off adhesion strength compared to the second portion of the cover.

22. The bag according to claim 1, wherein the second portion of the cover comprises a fold.

23. The bag according to claim 1, wherein the bag comprises a coating under the second portion of the cover.

24. The bag according to claim 1, wherein the cover comprises a cut or perforation.

25. The bag according to claim 24, wherein the first portion of the cover comprises a cut or perforation.

26. The bag according to claim 1, wherein the cover is adapted to remove no portion of the bag upon removal of the cover.

27. The bag according to claim 1, wherein the first end portion is adapted to prevent or reduce fraying of the bag at the first end of the first side portion cut upon opening, and the second end portion is adapted to prevent or reduce fraying of the bag of the bag at the second end of the second side portion cut upon opening.

28. The bag according to claim 1, wherein the central cut, the first side portion cut, and the second side portion cut, extend about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or about 99% of a distance across the front wall of the bag, the back wall of the bag, or a combination thereof.

29. The bag according to claim 1, wherein the central cut, the first side portion cut, and the second side portion cut extend between about 5% and about 95%, about 10% and about 90%, about 15% and about 85%, about 20% and about 80%, about 25% and about 75%, about 30% and about 70%, about 35% and about 65%, about 40% and about 60%, or about 45% and about 55% of a distance across the front wall of the bag, the back wall of the bag, or a combination thereof.

30. The bag according to claim 1, wherein each of the first end and the second end of the bag are closed, and wherein the bag comprises at least 10 pounds, 20 pounds, 30 pounds, 40 pounds, 50 pounds, 60 pounds, 70 pounds, 80 pounds, 90 pounds or 100 pounds by weight of a filling material.

31. The bag according to claim 1, wherein the first end panel of the bag comprises printing and the second end panel of the bag comprises printing.

32. The bag according to claim 1, further comprising a first side wall comprising a first side, a second side, a first end and a second end, and a second side wall comprising a first side, a second side, a first end and a second end, said first side of said first side wall attached to said second side of said second portion of said back wall, said second side of said first side wall attached to said first side of said front wall, said first side of said second side wall attached to said second side of said front wall, and said second side of said second side wall attached to said first side of said first portion of said back wall.

33. A bag comprising a front wall, a back wall, a first end adapted to form a first end panel when the first end is closed, a second end adapted to form a second end panel when the second end is closed, with each of the front wall and the back wall having an interior surface and an exterior surface and each comprising a first layer, a second layer, and a third layer, wherein the first layer comprises woven strips comprising oriented polypropylene, the second layer comprises an oriented polymer film comprising polypropylene, the third layer comprises an oriented polymer film comprising polypropylene, and the first layer and the third layer are laminated together by the second layer, wherein the bag comprises a plurality of perforations located on the front wall of the bag and proximal the first end of the bag, wherein the plurality of perforations each penetrate through the first layer, the second layer, and the third layer, and wherein the plurality of perforations comprise (a) a central portion having a first end and a second end, (b) a first side portion having a first end and having a second end located proximal to the first end of the central portion, (c) a second side portion having a first end located proximal to the second end of the central portion and having a second end, (d) a first end portion located proximal to the first end of the first side portion, and (e) a second end portion located proximal to the second end of the second side portion, wherein the central portion defines a curve that is concave towards the first end of the bag each of the first side portion and the second side portion defines a line extending away from the central portion and towards the first end of the bag, and wherein at least a portion of the first end portion is closer to the first end of the bag than the first end of the first side portion, and at least a portion of the second end portion is closer to the first end of the bag than the second end of the second side portion, and wherein the first end portion and the second end portion each define a curve which is concave towards the center axis of the front wall of the bag, wherein each of the first end portion and the second end portion retards the propagation of tearing of the front bag wall when the first side portion or the second side portion, respectively, is torn, and wherein said bag further comprises a cover having a pull tab, wherein the cover is located on the exterior of the front wall of said bag and covers at least the central portion, the first side portion, the second side portion, the first end portion, and the second end portion.

34. The bag according to claim 33 wherein the first end portion and the second end portion are each adapted to stop the propagation of a tear in the front wall of the bag past the first end portion and the second end portion, respectively.

35. The bag according to claim 33 wherein at least one of the size, number, depth, or pattern of perforations of the plurality of perforations varies.

36. The bag according to claim 33 wherein the depth of the plurality of perforations varies.

37. The bag according to claim 34 wherein the central portion, the first side portion, the second side portion, the first end portion, and the second end portion are adapted to reduce fraying of at least one of the woven polymer layer and the polymer film layer.

* * * * *